US008381126B2

(12) United States Patent
Gould

(10) Patent No.: US 8,381,126 B2
(45) Date of Patent: *Feb. 19, 2013

(54) COMPUTER USER INTERFACE WITH NON-SALIENCE DEEMPHASIS

(75) Inventor: Eric Justin Gould, Austin, TX (US)

(73) Assignee: MONKEYmedia, Inc., Austin, TX (US)

( * ) Notice: Subject to any disclaimer, the term of this patent is extended or adjusted under 35 U.S.C. 154(b) by 657 days.

This patent is subject to a terminal disclaimer.

(21) Appl. No.: 09/947,196

(22) Filed: Sep. 4, 2001

(65) Prior Publication Data

US 2002/0093496 A1 Jul. 18, 2002

Related U.S. Application Data

(63) Continuation of application No. 09/451,594, filed on Nov. 30, 1999, now Pat. No. 6,335,730.

(51) Int. Cl.
*G06F 3/048* (2006.01)

(52) U.S. Cl. ........ 715/801; 715/785; 715/786; 715/787; 345/661; 345/607

(58) Field of Classification Search .................. 715/772, 715/767, 784–787, 801
See application file for complete search history.

(56) References Cited

U.S. PATENT DOCUMENTS

| 4,305,131 A | 12/1981 | Best |
| 4,333,152 A | 6/1982 | Best |
| 4,415,271 A | 11/1983 | Mori |
| 4,445,187 A | 4/1984 | Best |
| 4,520,404 A | 5/1985 | Von Kohorn |
| 4,569,026 A | 2/1986 | Best |
| 4,591,840 A | 5/1986 | Curtis et al. |
| 4,645,238 A | 2/1987 | Vincent et al. |
| 4,685,003 A | 8/1987 | Westland |
| 4,695,953 A | 9/1987 | Blair et al. |
| 4,711,543 A | 12/1987 | Blair et al. |
| 4,754,342 A | 6/1988 | Duffy |
| 4,755,811 A | 7/1988 | Slavin et al. |
| 4,779,252 A | 10/1988 | Custers et al. |
| 4,780,839 A | 10/1988 | Hirayama |
| 4,786,967 A | 11/1988 | Smith, III et al. |
| 4,790,028 A * | 12/1988 | Ramage ........................ 382/298 |
| 4,800,379 A | 1/1989 | Yeomans |
| 4,864,502 A * | 9/1989 | Kucera et al. ..................... 704/8 |
| 4,875,096 A | 10/1989 | Baer et al. |
| 4,888,638 A | 12/1989 | Bohn |

(Continued)

FOREIGN PATENT DOCUMENTS

| CN | 96122685 | 5/2003 |
| EP | 0346979 | 12/1989 |

(Continued)

OTHER PUBLICATIONS

Gould, Eric J., "*Relativity Controller, Reflecting User Perspective in Document Spaces*" Inter CHI '93 Adjunct Proceedings.

(Continued)

*Primary Examiner* — Ba Huynh

(57) ABSTRACT

A relativity controller is a scroll bar/window combination that provides a way to see data in relation to both the context of its wholeness and the salience of its contents. To accomplish this, the linear density or other appearance of the scroll bar (acting as a ruler or scale) varies with the density of the document salience (as indicated by different kinds of annotations or marks). It also provides a way to zoom between perspectives. This is usable on many different data types: including sound, video, graphics, calendars and word processors.

79 Claims, 40 Drawing Sheets

U.S. PATENT DOCUMENTS

| | | | |
|---|---|---|---|
| 4,930,160 A | 5/1990 | Vogel | |
| 4,931,783 A | 6/1990 | Atkinson | |
| 5,023,727 A | 6/1991 | Boyd et al. | |
| 5,023,851 A | 6/1991 | Murray et al. | |
| RE33,662 E | 8/1991 | Blair et al. | |
| 5,039,937 A * | 8/1991 | Mandt et al. | 324/121 R |
| 5,050,961 A | 9/1991 | Venolia | |
| 5,055,924 A | 10/1991 | Skutta | |
| 5,076,584 A | 12/1991 | Openiano | |
| 5,095,448 A * | 3/1992 | Obuchi et al. | 715/519 |
| 5,101,364 A | 3/1992 | Davenport et al. | |
| 5,107,343 A | 4/1992 | Kawai | |
| 5,109,482 A | 4/1992 | Bohrman | |
| 5,122,886 A | 6/1992 | Tanaka | |
| 5,129,057 A | 7/1992 | Strope et al. | |
| 5,146,212 A | 9/1992 | Venolia | |
| 5,155,591 A | 10/1992 | Wachob | |
| 5,159,668 A | 10/1992 | Kaasila | |
| 5,172,111 A | 12/1992 | Olivo, Jr. | |
| 5,175,631 A | 12/1992 | Juri et al. | |
| 5,204,969 A | 4/1993 | Capps et al. | |
| 5,220,540 A | 6/1993 | Nishida et al. | |
| 5,245,441 A * | 9/1993 | Ruben | 382/235 |
| 5,247,438 A | 9/1993 | Subas et al. | |
| 5,261,031 A | 11/1993 | Saito | |
| 5,313,297 A | 5/1994 | Fukui et al. | |
| 5,333,247 A | 7/1994 | Gest et al. | |
| 5,339,391 A * | 8/1994 | Wroblewski et al. | 345/607 |
| 5,341,466 A * | 8/1994 | Perlin et al. | 345/668 |
| 5,359,712 A | 10/1994 | Cohen et al. | |
| 5,365,360 A | 11/1994 | Torres | |
| 5,369,570 A | 11/1994 | Parad | |
| 5,371,532 A | 12/1994 | Gelman et al. | |
| 5,371,846 A | 12/1994 | Bates | |
| 5,386,493 A | 1/1995 | Degen et al. | |
| 5,388,197 A | 2/1995 | Rayner | |
| 5,422,468 A | 6/1995 | Abecassis | |
| 5,428,731 A | 6/1995 | Powers, III | |
| 5,434,678 A | 7/1995 | Abecassis | |
| 5,434,954 A * | 7/1995 | Kawauchi et al. | 345/440 |
| 5,438,356 A | 8/1995 | Ushiki et al. | |
| 5,442,744 A | 8/1995 | Plech et al. | |
| 5,446,833 A | 8/1995 | Miller et al. | |
| 5,446,882 A | 8/1995 | Capps et al. | |
| 5,448,746 A * | 9/1995 | Eickemeyer et al. | 712/210 |
| 5,466,882 A | 11/1995 | Lee | |
| 5,479,600 A * | 12/1995 | Wroblewski et al. | 715/787 |
| 5,491,781 A * | 2/1996 | Gasperina | 715/786 |
| 5,510,808 A | 4/1996 | Cina, Jr. et al. | |
| 5,513,306 A | 4/1996 | Mills et al. | |
| 5,519,719 A * | 5/1996 | Elpers et al. | 714/738 |
| 5,519,820 A * | 5/1996 | Kawauchi et al. | 345/440 |
| 5,524,195 A | 6/1996 | Clanton, III et al. | |
| 5,524,637 A | 6/1996 | Erickson | |
| 5,532,715 A | 7/1996 | Bates et al. | |
| 5,537,141 A | 7/1996 | Harper et al. | |
| 5,553,221 A | 9/1996 | Reimer et al. | |
| 5,553,225 A * | 9/1996 | Perry | 715/786 |
| 5,557,724 A | 9/1996 | Sampat et al. | |
| 5,559,949 A | 9/1996 | Reimer et al. | |
| 5,574,567 A | 11/1996 | Cookson et al. | |
| 5,579,463 A * | 11/1996 | Takano et al. | 345/440 |
| 5,586,216 A | 12/1996 | Degen et al. | |
| 5,589,945 A | 12/1996 | Abecassis | |
| 5,596,705 A | 1/1997 | Reimer et al. | |
| 5,598,276 A | 1/1997 | Cookson et al. | |
| 5,607,356 A | 3/1997 | Schwartz | |
| 5,610,653 A | 3/1997 | Abecassis | |
| 5,617,523 A * | 4/1997 | Imazu et al. | 345/440 |
| 5,623,588 A * | 4/1997 | Gould | 715/787 |
| 5,623,589 A | 4/1997 | Needham et al. | |
| 5,630,006 A | 5/1997 | Hirayama et al. | |
| 5,634,849 A | 6/1997 | Abecassis | |
| 5,636,036 A | 6/1997 | Ashbey | |
| 5,644,507 A | 7/1997 | Ostrover et al. | |
| 5,648,918 A | 7/1997 | Hubbard | |
| 5,664,046 A | 9/1997 | Abecassis | |
| 5,684,918 A | 11/1997 | Abecassis | |
| 5,692,212 A | 11/1997 | Roach et al. | |
| 5,696,869 A | 12/1997 | Abecassis | |
| 5,696,905 A | 12/1997 | Reimer et al. | |
| 5,708,767 A | 1/1998 | Yeo et al. | |
| 5,708,845 A | 1/1998 | Wistendahl et al. | |
| 5,715,400 A | 2/1998 | Reimer et al. | |
| 5,717,814 A | 2/1998 | Abecassis | |
| 5,724,472 A | 3/1998 | Abecassis | |
| 5,737,479 A | 4/1998 | Fujinami | |
| 5,737,527 A | 4/1998 | Shiels et al. | |
| 5,737,552 A | 4/1998 | Lavallee et al. | |
| 5,745,710 A | 4/1998 | Clanton, III et al. | |
| 5,751,953 A | 5/1998 | Shiels et al. | |
| 5,754,770 A | 5/1998 | Shiels et al. | |
| 5,764,818 A * | 6/1998 | Capps et al. | 382/317 |
| 5,771,334 A | 6/1998 | Yamauchi et al. | |
| 5,774,666 A | 6/1998 | Portuesi | |
| 5,781,730 A | 7/1998 | Reimer et al. | |
| 5,781,886 A | 7/1998 | Tsujiuchi | |
| 5,799,280 A | 8/1998 | Degen et al. | |
| 5,805,806 A | 9/1998 | McArthur | |
| 5,815,671 A | 9/1998 | Morrison | |
| 5,828,788 A | 10/1998 | Chiang et al. | |
| 5,828,995 A | 10/1998 | Chiang et al. | |
| 5,841,979 A | 11/1998 | Schulhof et al. | |
| 5,848,934 A | 12/1998 | Shiels et al. | |
| 5,861,881 A | 1/1999 | Freeman et al. | |
| 5,864,868 A | 1/1999 | Contois | |
| 5,872,927 A | 2/1999 | Shiels et al. | |
| 5,892,507 A | 4/1999 | Moorby et al. | |
| 5,892,966 A | 4/1999 | Petrick et al. | |
| 5,905,845 A | 5/1999 | Okada et al. | |
| 5,907,658 A | 5/1999 | Murase et al. | |
| 5,913,013 A | 6/1999 | Abecassis | |
| 5,915,067 A | 6/1999 | Nonomura et al. | |
| 5,936,625 A | 8/1999 | Kahl et al. | |
| 5,945,998 A | 8/1999 | Eick | |
| 5,953,006 A * | 9/1999 | Baker et al. | 715/700 |
| 5,953,485 A | 9/1999 | Abecassis | |
| 5,973,663 A | 10/1999 | Bates et al. | |
| 5,987,211 A | 11/1999 | Abecassis | |
| 5,999,173 A | 12/1999 | Ubillos | |
| 5,999,696 A | 12/1999 | Tsuga et al. | |
| 5,999,698 A | 12/1999 | Nakai et al. | |
| 6,002,833 A | 12/1999 | Abecassis | |
| 6,006,273 A | 12/1999 | Ostrover et al. | |
| 6,011,895 A | 1/2000 | Abecassis | |
| 6,018,612 A | 1/2000 | Thomason et al. | |
| 6,026,446 A | 2/2000 | Ostrover et al. | |
| 6,038,367 A | 3/2000 | Abecassis | |
| 6,061,062 A * | 5/2000 | Venolia | 715/856 |
| 6,065,042 A | 5/2000 | Reimer et al. | |
| 6,067,401 A | 5/2000 | Abecassis | |
| 6,072,934 A | 6/2000 | Abecassis | |
| 6,091,886 A | 7/2000 | Abecassis | |
| 6,108,281 A | 8/2000 | Tozaki et al. | |
| 6,111,567 A | 8/2000 | Savchenko et al. | |
| 6,128,712 A | 10/2000 | Hunt et al. | |
| 6,144,375 A | 11/2000 | Jain et al. | |
| 6,148,140 A | 11/2000 | Okada et al. | |
| 6,151,444 A | 11/2000 | Abecassis | |
| 6,167,439 A * | 12/2000 | Levine et al. | 709/217 |
| 6,175,840 B1 | 1/2001 | Chen et al. | |
| 6,177,938 B1 * | 1/2001 | Gould | 715/784 |
| 6,181,332 B1 | 1/2001 | Salahshour et al. | |
| 6,185,365 B1 | 2/2001 | Murase et al. | |
| 6,192,340 B1 | 2/2001 | Abecassis | |
| 6,208,805 B1 | 3/2001 | Abecassis | |
| 6,215,491 B1 * | 4/2001 | Gould | 345/660 |
| 6,219,052 B1 * | 4/2001 | Gould | 345/661 |
| 6,222,925 B1 | 4/2001 | Shiels et al. | |
| 6,260,194 B1 | 7/2001 | Shiels et al. | |
| 6,269,216 B1 | 7/2001 | Abecassis | |
| 6,289,165 B1 | 9/2001 | Abecassis | |
| 6,304,715 B1 | 10/2001 | Abecassis | |
| 6,335,730 B1 * | 1/2002 | Gould | 715/784 |
| 6,336,002 B1 | 1/2002 | Yamauchi et al. | |
| 6,343,298 B1 | 1/2002 | Savchenko et al. | |
| 6,356,707 B1 | 3/2002 | Murase et al. | |

| | | | |
|---|---|---|---|
| 6,366,732 B1 | 4/2002 | Murase et al. | |
| 6,370,199 B1 | 4/2002 | Bock et al. | |
| 6,377,996 B1 | 4/2002 | Lumelsky et al. | |
| 6,385,388 B1 | 5/2002 | Lewis et al. | |
| 6,388,684 B1 * | 5/2002 | Iwamura et al. | 715/788 |
| 6,393,158 B1 | 5/2002 | Gould et al. | |
| 6,408,128 B1 | 6/2002 | Abecassis | |
| 6,446,261 B1 | 9/2002 | Rosser | |
| 6,457,025 B2 | 9/2002 | Judson | |
| 6,463,207 B1 | 10/2002 | Abecassis | |
| 6,490,405 B1 | 12/2002 | Speed et al. | |
| 6,501,515 B1 | 12/2002 | Iwamura | |
| 6,553,178 B2 | 4/2003 | Abecassis | |
| 6,580,870 B1 | 6/2003 | Kanazawa et al. | |
| 6,615,270 B2 | 9/2003 | Gould et al. | |
| 6,621,980 B1 | 9/2003 | Gould et al. | |
| 6,714,723 B2 | 3/2004 | Abecassis | |
| 6,973,669 B2 | 12/2005 | Daniels | |
| 7,054,547 B1 | 5/2006 | Abecassis | |
| 7,286,747 B1 | 10/2007 | Lewis et al. | |
| 7,437,751 B2 | 10/2008 | Daniels | |
| 7,467,218 B2 | 12/2008 | Gould et al. | |
| 7,477,268 B2 * | 1/2009 | Venolia | 345/661 |
| 7,890,648 B2 | 2/2011 | Gould et al. | |

FOREIGN PATENT DOCUMENTS

| | | |
|---|---|---|
| EP | 0677842 | 10/1995 |
| EP | 0814475 | 12/1997 |
| JP | 08278882 | 9/1998 |

OTHER PUBLICATIONS

IBM, "*Systems Application Architecture, Common User Access Advanced Interface Design Guide*" IBM © 1989.

Mackinlay, Jack, "*The Perspective Wall: Detail and Context Smoothly Integrated*", Xerox 1991.

Furnas, George, "Generalized Fisheye View", Bell Communications © 1986.

Mills, et al, "*A Magnifier Tool for Video Data*", ACM © 1992.

Degen, et al "*Working with Audio: Integrating Personal Tape Recorders and Desktop Computers*" ACM © 1992.

Chimera, Richard, "*Value Bars: An Information Visualization and Navigation Tool for Multi-Attribute Listings*", CHI 1992.

"Relativity Controller: Reflecting User Perspective in Document Spaces," Gould, Eric J., InterCHI'93 Adjunct Proceedings (1993) [01—Gould.pdf].

"IBM Systems Application Architecture: Common User Access Advanced Interface Design Guide," IBM (1989).

"The Perspective Wall: Detail and Context Smoothly Integrated," Mackinlay, Jack, Xerox (1991) [03—Mackinlay.pdf].

"Generalized Fisheye Views," Furnas, George, Bell Communications (1986) [04—Furnas.pdf].

"A Magnifier Tool for Video Data," Mills, Michael, et al., ACM (1992) [05—Mills.pdf].

"Working with Audio: Integrating Personal Tape Recorders and Desktop Computers," Degen, Leo, et al., ACM (1992) [06—Degen.pdf].

"Value Bars: An Information Visualization and Navigation Tool for Multi-Attribute Listings," Chimera, Richard, CHI'92 (1992) [07—Chimera.pdf].

"Philips CDV 495/CDV496 Operating Instructions" [08—CDV496_OM_PHILIPS_EN.pdf].

"Toshiba DVD Video Player SD3107 Owner's Manual," [09—sd-3107_om_e.pdf].

"Full Service Network," Wikipedia <http://en.wikipedia.org/wiki/Full_Service_Network> [10—FSN-01—Full Service Network—Wikipedia, the free encyclopedia.pdf].

"Full Service Network (FSN) in Orlando Florida," <http://www.ust.hk/~webiway/content/USA/Trial/fsn.html> [11—FSN-02—Full Service Network.pdf].

"Time Warner Cable's Full Service Network Unveils New Navigator," Business Wire, Tuesday, Apr. 30, 1996 <http://www.allbusiness.com/media-telecommunications/telecommunications/7225702-1.html> [12—FSN-03—Time Warner Cable's Full Service Network.pdf].

"Time-Warner's Home of the 21st Century," by Davis, Arnold, Educom Review vol. 31 No. 1, Jan./Feb. 1996, <http://net.educause.edu/apps/er/review/reviewArticles/31130.html> [13—FSN-04—Educom Review.pdf].

"Touch of a Button," Spartanburg Herald-Journal Home Section C p1 and continuation page <http://news.google.com/newspapers?nid=1876&dat=19950124&id=9LMeAAAAIBAJ&sjid =Ss8EAAAAIBAJ&pg=4619,2458911> [14—FSN-05-G-SHJ-950124.pdf].

"Design Issues for Interactive Television Systems," by B. Furht, D. Kalra, F. Kitson, A.A. Rodriguez, and W.E. Wall, IEEE Computer, vol. 28, No. 5, May 1995, pp. 25-39, <http://www.cse.fau.edu/~borko/Paper_Computer1995.pdf> [15—Furht—Paper_Computer1995.pdf].

"Movie-maps: An application of the optical videodisc to computer graphics," Lippman, A., Proceedings of the 7th Annual Conference on Computer Graphics and Interactive Techniques, Seattle, Washington, pp. 32-42 (1980) [16—MovieMaps.pdf].

"New Orleans in Transition: The Interactive Delivery of a Cinematic Case Study," Davenport, G. (Aug. 1987) (Revised from remarks given at the International Congress for Design Planning and Theory, Park Plaza Hotel, Boston, 1987) [17—NewOrleans.pdf].

"Creating and Viewing the Elastic Charles—a Hypermedia Journal," Brøndmo, H.; Davenport, G. (1989) (Revised from document published in the Hypertext II Conference Proceedings, York, England, Jul. 1989) [18—ElasticCharles.pdf].

"Orchestrating Digital Micromovies," Davenport, G. et al., Leonardo, vol. 26 No. 4, pp. 283-288, (1993) [19—Micromovies.pdf].

"HyperCafe: Narrative and Aesthetic Properties of Hypervideo," Sawhney et al., Hypertext '96 Proceedings of the Seventh ACM Conference on Hypertext, (1996) [20—HyperCafe.pdf].

"HotVideo: The Cool Way to Link," IBM Research Magazine, vol. 3 (1997) [21—HotVideo.pdf].

"Adding Hyperlinks to Digital Television," Bove, V. Michael, Jr. et al., Proc. SMPTE $140^{th}$ Technical Conference, (1998) [22—Hyperlinks.pdf].

"Construction of Interactive Movie System for Multi-Person Participation," Nakatsu, Ryohei, et al., ICMCS 1998: 228-232 (1998) [23—InteractiveMovie.pdf].

U.S. Appl. No. 07/990,339, filed Dec. 14, 1992, US Pat. 5,623,588 now abandoned.
U.S. Appl. No. 09/947,196, filed Sep. 4, 2001.
U.S. Appl. No. 11/978,965, filed Oct. 30, 2007.
U.S. Appl. No. 11/978,964, filed Oct. 30, 2007.
U.S. Appl. No. 11/978,945, filed Oct. 30, 2007.
U.S. Appl. No. 12/248,931, filed Oct. 10, 2008.
U.S. Appl. No. 11/978,967, filed Oct. 30, 2007, abandoned.
U.S. Appl. No. 11/978,954, filed Oct. 30, 2007, abandoned.
U.S. Appl. No. 12/941,830, filed Nov. 8, 2010.
U.S. Appl. No. 09/298,586, filed Apr. 23, 1999, abandoned.
U.S. Appl. No. 10/360,271, filed Feb. 7, 2003, abandoned.
U.S. Appl. No. 08/038,240, filed Mar. 29, 1993, Daniels.
U.S. Appl. No. 08/306,642, filed Sep. 15, 1994, Daniels.
U.S. Appl. No. 60/014,959 filed Apr. 8, 1996, Daniels.
U.S. Appl. No. 08/641,517, filed May 1, 1996, Daniels.
U.S. Appl. No. 08/900,417, filed Jul. 25, 1997, Daniels.
U.S. Appl. No. 12/246,161, filed Oct. 6, 2008, Daniels.
Re-Examination File for Control No. 90/011,365, filed Dec. 3, 2010.
Re-Examination File for Control No. 95/001,504, filed Dec. 9, 2010.
Re-Examination File for Control No. 95/001,506, filed Feb. 15, 2011.
Docket Sheet from Civil Action 1:10-cv-00319-SS dated May 13, 2011.
Documents from Civil Action 1:10-cv-00319-SS as of May 13, 2011.
Docket Sheet from Civil Action 1:10-cv-00533-SS dated May 13, 2011.
Documents from Civil Action 1:10-cv-00533-SS as of May 13, 2011.

* cited by examiner

Main

Handle Event

Adjust Controls

Scale Cursor

Relative Movies Task

Relative Movies Task

Relative Movies Task

Handle Mouse Down

Handle Mouse Up

Adjust Menus

Handle Menu

Handle Menu

Open Movie

Movie Mouse Down

Movie Mouse Up

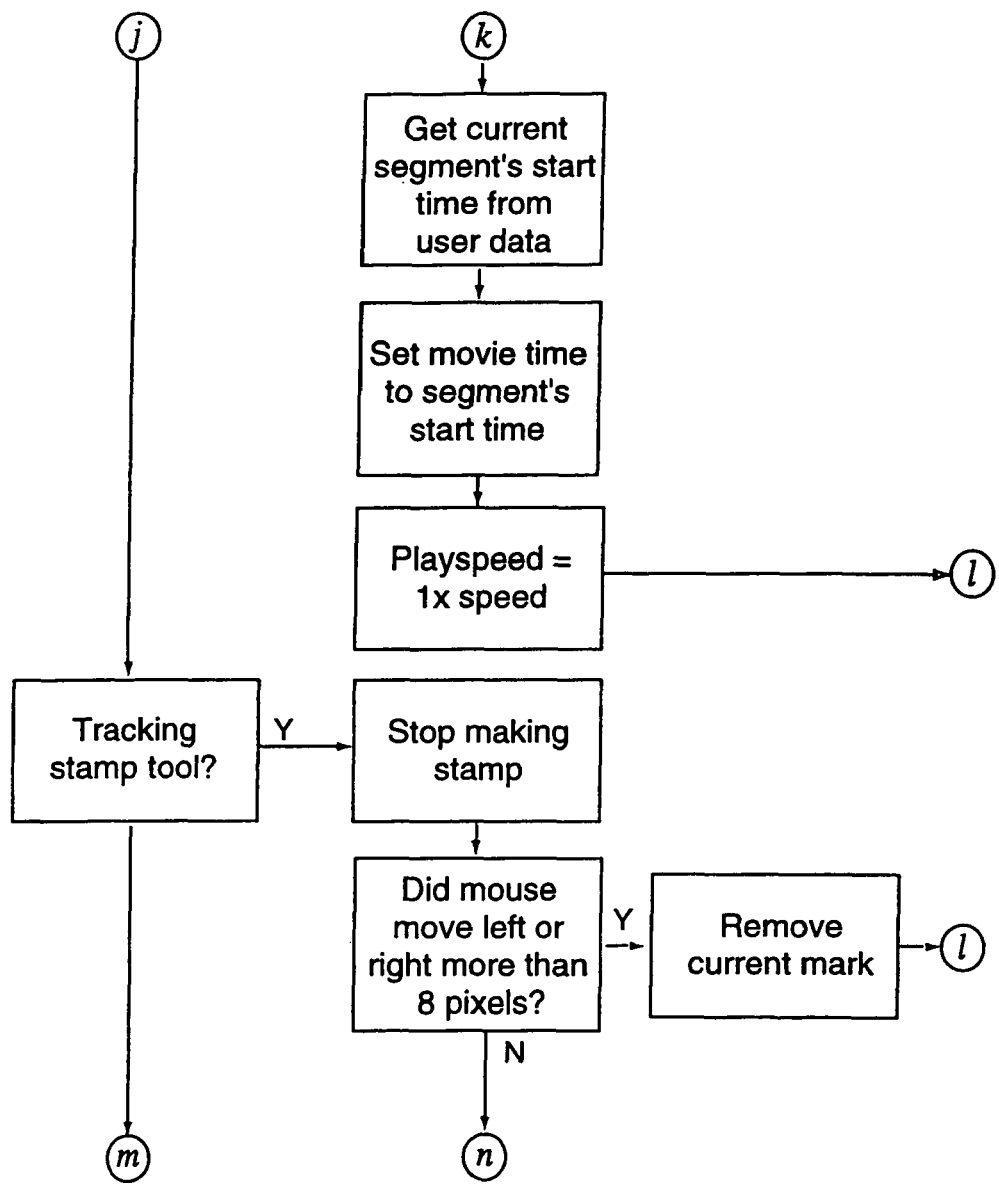

Movie Mouse Up

Draw Controller

Update Scroller

Update Scroller

Track Thumb

Track Thumb

Draw Thumb

Draw Thumb

Add Mark

Add Mark

Draw Mark (in Scroller)

Draw Mark (in Scroller)

Draw Mark (in Scroller)

Draw Mark (in Scroller)

COMPUTER USER INTERFACE WITH NON-SALIENCE DEEMPHASIS

RELATED APPLICATIONS

The present continuation application claims the benefit of U.S. application Ser. No. 09/451,594, filed Nov. 30, 1999, now U.S. Pat. No. 6,335,730 and entitled Computer User Interface with Non-Salience De-Emphasis which in turn claims benefit of prior application Ser. No. 08/844,466 filed Apr. 18, 1997, and entitled Computer User Interface with Non-Salience De-Emphasis, and 07/990,339 filed Dec. 14, 1992, and entitled Computer User Interface with Non-Salience De-Emphasis, incorporated herein by reference.

This invention relates to a computer system, and in particular to computer tools to improve user perspectives and enhance navigation or browsing of information sources stored in or available via the computer.

BACKGROUND OF INVENTION

As computer accessing of large quantities of information increases, the ability of users to navigate large information spaces and to maintain visualization or personal perspectives thereof decreases [1] (bracketed numbers reference publications identified in Appendix A).

The need for this type of control has been expressed most recently by Furnas [2], Mills [3], Degen [4], and Chimera [5].

Furnas' solution to the problem of understanding the limited information available in a window of large information structures is to provide in the window the detailed region to be considered in the context of important preceding or succeeding parts of the large structure. For example, to edit lines in the middle of a program, the window would also display, say, declarations at the beginning of the program. No magnification of desired information or shrinkage of undesired information is employed; rather, the desired program information is normally displayed, and many parts of the program are omitted from the display.

Mills et al addressed the issue of giving users access to video data by magnifying time through successive hierarchial extraction of increasingly detailed segments. Each expanded segment view was displayed in a separate window of the display. And each segment view, as well as the total video view, including the time lines associated therewith, were linearly arranged from a temporal standpoint.

Degen et al moved marks on audio tape to a digitized counterpart document scroll bar, and let the user change the visual scaling of time within a single window, as well as the speed of playback. But, again, the visual representations, whether of the original size or of the zoomed expanded size, had a linear temporal structure.

Chimera, on the other hand, maintained a full display within the window but was unable to provide a zooming feature or expanded segment view of a text listing. Instead, Chimera used scroll bars that, independent of the original data's representation, indicate relative values of list attributes by respectively scaling proportions of list item indicators, according to those attributes, in the scroll bars.

Furnas shows in a single window multiple fisheye views of document segments. But Furnas doesn't disclose how a user can select which segments to display, or the means to magnify certain segments, or the means to control the degree of magnification, nor does Furnas provided a scroll bar or its equivalent as a convenient interface for the user to manipulate the display.

SUMMARY OF INVENTION

An object of the invention is a computer system providing improved means to allow users to extract important segments of computer-displayed information in the form of video, sound, graphics or text while maintaining a general view of the information.

Another object of the invention is a computerized system and method to enable users better to navigate or visualize large information spaces.

In accordance with one aspect of the present invention, means are provided to enable a user to visibly mark points or segments of displayed information, which will enable the user to quickly navigate to the marked displays.

In another aspect of the invention, a scroll bar is displayed alongside the information display, and the visible mark or marks appears on the scroll bar at locations corresponding to the desired information.

In accordance with a further aspect of the present invention, a computerized system provides the user with means to shrink less important or less significant portions of the information displayed, with the result of magnifying the portions that the user deems significant. In accordance with this aspect, the invention can be viewed as a user-friendly relativity controller tool that enables users to specify what is important to them, and modify the portion of their perceptual space that that information takes up, in a fisheye variant.

In accordance with another aspect of the invention, the resultant information can still occupy the same window where originally displayed, but with certain segments shrunk and other segments in comparison standing out or becoming more prominent.

In accordance with still other aspects of the invention, the relativity controller of the invention is implemented by simply pointing to the screen and actuating a control device. In a preferred embodiment, a mouse button is pressed to mark the beginning and end of segments of the information to be marked. A further feature is that multiple segments can be marked in this manner. Thus, the relativity controller of the invention not only allows users to mark the scope of one or more salient segments, but also will cause the display to simultaneously shrink the non-marked portions and in effect zoom into the multiple-marked segments in a single step. The result is a non-linear display of the available information. As a further feature, simultaneously with selective zooming of the information, the display of the scroll bar is correspondingly modified to show in the context of the total information the marked and non-marked portions of the displayed information.

The major benefits is to allow users to quickly navigate through a large information space and to control the salience of the displayed information in the context of the full display while conserving display area, sometime called desktop real estate. Moreover, maintaining a single window for the data and giving users the ability to visually navigate across the whole data via the scroll bar together with the ability to select the salient segments as well as the level of zoom, all in a single step, greatly enhances the ability of the user to cope intelligently and rapidly with large information structures containing large numbers of objects.

The above and further objects, details and advantages of the present invention will become apparent from the following detailed description of preferred embodiments thereof, when read in conjunction with the accompanying drawings.

SUMMARY OF DRAWINGS

FIGS. 15-33 are flow charts for implementing one form of computerized system of the invention.

DETAILED DESCRIPTION OF PREFERRED EMBODIMENTS

Figure 1:
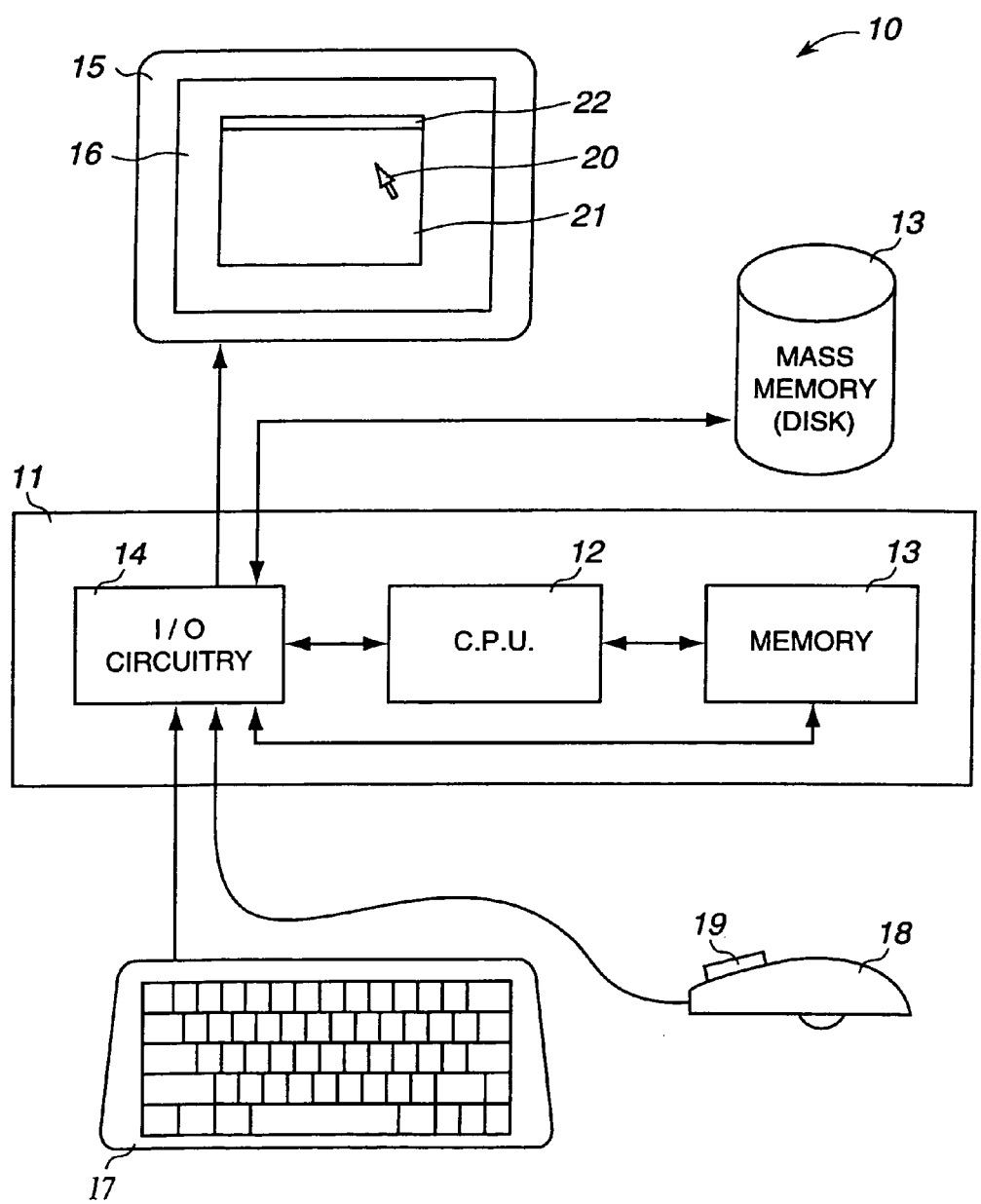
FIG. 1 is a block diagram of a typical computer system.

FIG. 1 shows a typical computerized system 10, comprising a console 11 containing a CPU 12, memory 13 in the form of RAM, ROM and disk, and I/O circuitry 14 connected to a monitor 15 having a display screen 16, and control devices in the form of keyboard 17 and a mouse 18. The mouse 18 typically contains button switches 19 operated by a user of the system. A cursor or pointer 20 is typically displayed on the screen 16 and its position is controllable via the mouse 18 or the keyboard 17 as is well known. A typical window 21 is displayed on the screen 16, with a title bar in the window.

The following terms used herein will have the following meanings.

"Object" means any representation of information or of a data structure that can be displayed on the monitor screen, and includes one or more text characters, one or more sound representations such as a digital sample, a video representation such as a video frame, and in general any graphic's element.

"Control device" means devices manipulated by users to move cursors around a screen, and include a mouse and keyboard.

"Pointing" to an object on screen means actuating the control device to move the cursor so that it is over or adjacent the object. When the cursor is a pointer such an arrow, it means moving the arrow tip close to the object.

"Clicking" on an object means to press and quickly release a switch on the control device, such as a button on a mouse, when the cursor is pointing to the object.

"Dragging" means to click on the object, and while holding the switch activated, to manipulate the control device to move the object to a new screen location, and then to release the switch to fix the new screen location of the object.

"Double-clicking" an object on screen is by pointing to the object and clicking twice rapidly, often used for special control purposes.

"Shrinking" the display of objects means reducing the time or space normally allocated to display the objects, and includes shrinking them to the point where they essentially disappear from the display.

A "scroll bar" is a common control device displayed alongside a window, having, typically, at opposite ends small arrowed scroll boxes or buttons that when clicked on by the user causes the window contents to scroll.

A "button" or "box" on a scroll bar is a representation of a control device for use with a mouse.

A "thumb" is a button or box on the scroll bar, between its ends, which moves and whose location on the scroll bar corresponds to the location in the whole information of the current view.

FIG. 2-14 illustrate several ways in which the invention may be used. While the invention will be described in connection with a Macintosh personal computer (PC), which employs a graphics user interface (GUI), it is also usable with other PCs or workstations using other operating systems with GUIs, such as UNIX with X-windows, and DOS with Windows.

Figure 2:
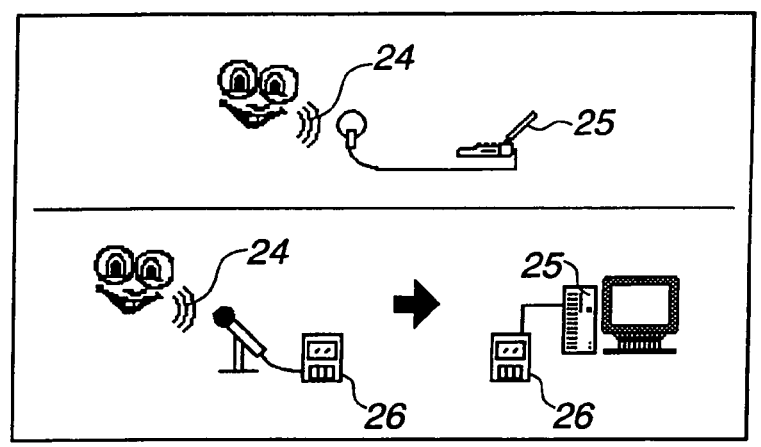
FIGS. 2-6 schematically illustrate one form of the invention for use with audio representations.
Figure 3:
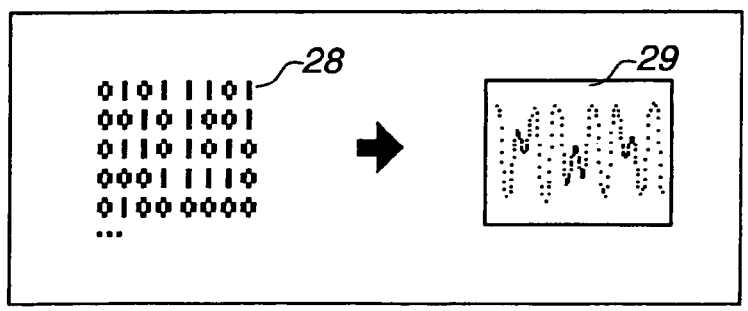
Figure 4:
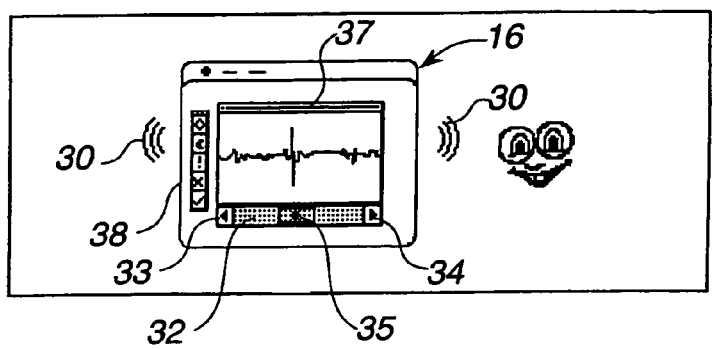

The first example concerns a sound representation. As illustrated in FIG. 2 on top, a user can sample audio 24 into a computer 25 as described in the Macintosh user's manual, or alternatively record audio 24 onto tape 26 and then sample into the computer 25. The computer processes the sound data 28 into a visual representation 29, based, for example, on Cochlear models, principal component analysis, or Fast Fourier Transforms, as shown in FIG. 3. The result is displayed on the monitor screen 16 and can also be heard 30 by the user. The typical monitor screen contains a scroll bar 32 for scrolling through the sound representation using a left arrow button 33 to scroll to the left, and a right arrow button 34 to scroll to the right. A thumb representation or button 35 which is displayed on the scroll bar shows by its location the portion of the sound representation displayed in the context of the whole sound. In other words, if the thumb 35 is at the center of the scroll bar 32, then the sound displayed is at the middle of the recording.

In a usual GUI display, a horizontal title bar 37 is located on top and a vertical menu or tool bar 38 is displayed at the left side clicking on any of the icons displayed in the tool bar will invoke appropriate software routines to carry out the function indicated by the icon. In this particular example, the user desires to annotate the sound representation, and the icons can represent an EDIT function, or a DRAW function including certain graphic symbols to be pasted into the sound representation.

In accordance with an aspect of the present invention, the computer has been trained or customized to recognize meaningful objects and mark them. In this particular case, a meaningful object can be any sound representation above a certain amplitude, i.e., loud sounds, but the computer can choose instead certain frequencies or ranges or certain sound sequences. Marking means with respect to the data structure representing the object to add a tag bit or other data representing a marked time or space position or point. If it is desired to mark a segment, meaning a temporal sequence of objects, then one tag data can represent the beginning of the marked segment, and another data bit can represent the end of the marked segment.

Figure 5:
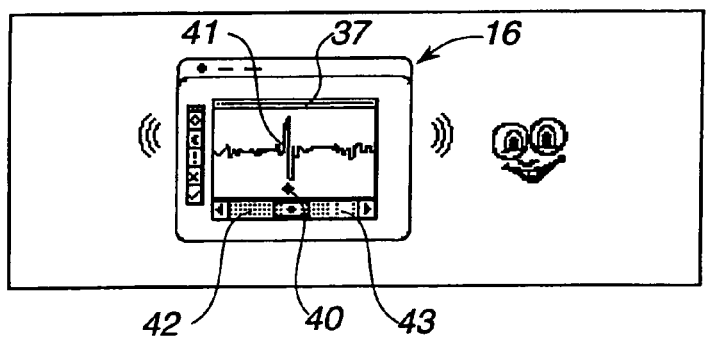

In accordance with another aspect of the present invention, the mark is displayed on the display. In FIG. 5 a diamond mark 40 is shown to indicate the temporal position of the large amplitude sound 41. When marks 40 are displayed at the salient points, the user can quickly fast-forward through the unmarked areas and then stop at or slowly play the marked points or segments by observing the mark or by programming the computer to automatically stop at marked points.

Figure 6:
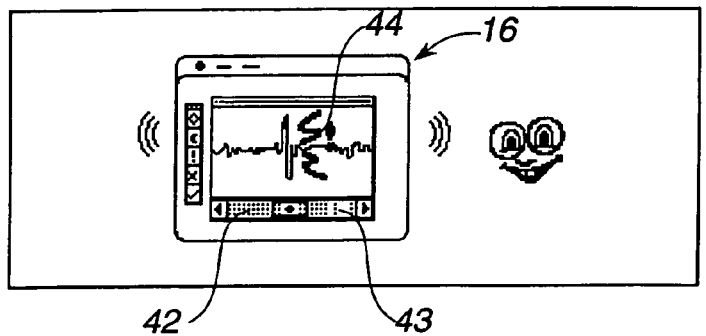

In accordance with another aspect of the invention, the scroll bar temporal representation is modified to display the marked points or segments. In the embodiment illustrated in FIG. 5, a density representation on the scroll bar is modified, with high density regions 42 representing unmarked segments, and low density regions 43 representing marked segments. Thus, while only a portion of the whole stored sound representation may be displayed in the window shown, the scroll bar in the window shown will show the positions of the marked segments or salient points relative to the whole set of objects stored. Thus, the user can quickly navigate to the salient points by the conventional fast forward or rewind buttons to reach and observe the annotated regions. FIG. 6 illustrates the customized annotation 44 added by the user to the sound representation. These annotations are also useful for indexing, hyper-navigation, and multi-sound catalogs. It is understood that marking 43 on the scroll bar can be used separately (FIG. 6) or together with marking 40 (FIG. 5) on the document display.

Figure 7:
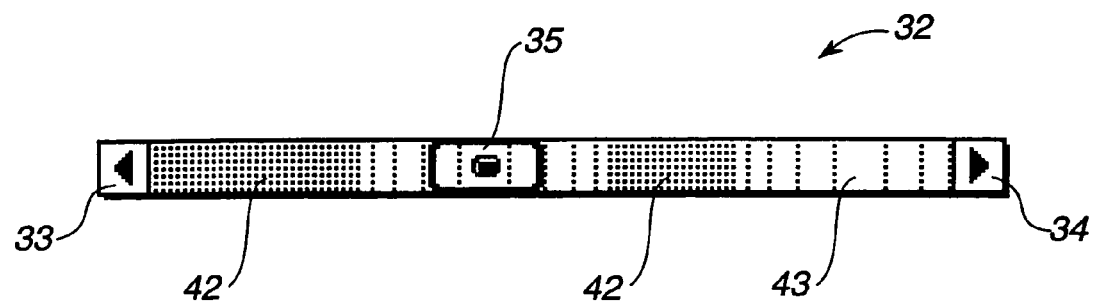
FIG. 7 is an enlarged view of a scroll bar in accordance with another form of the invention.

FIG. 7 shows an enlarged view of the scroll bar 32 indicating how high density 42 and low density 43 appearances can indicate non-marked and marked segments, respectively.

It will also be observed that the scope or range of the marked objects is visible on the scroll bar 32 by the width of low density segments 43.

Figure 8:
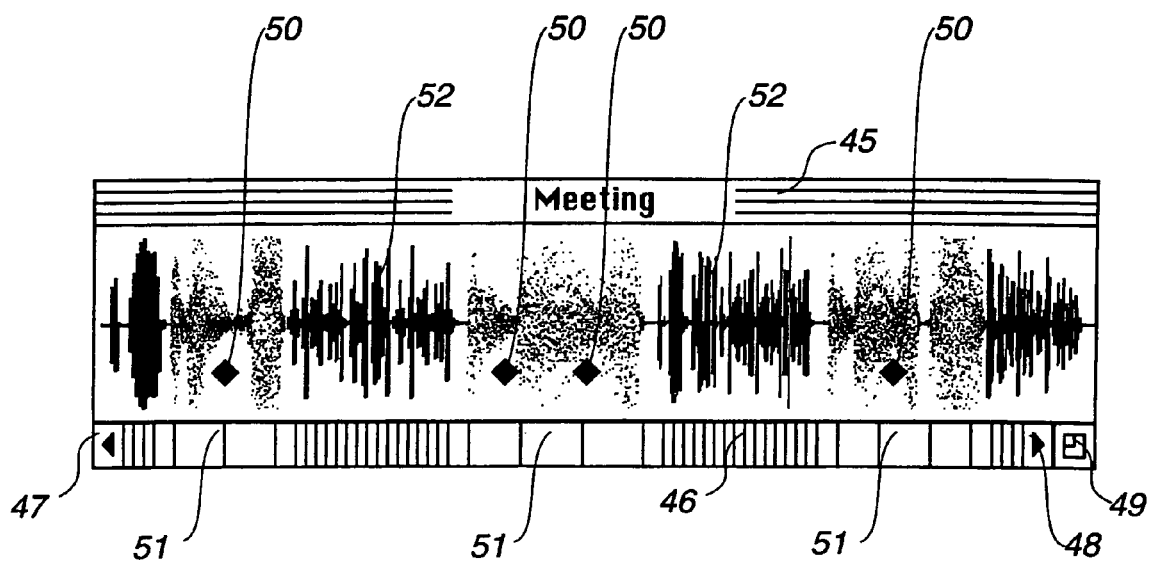
FIG. 8 is a combined screen display and scroll bar of audio information in accordance with the invention.

FIG. 8 shows another view of a screen window with a title bar 45 and a scroll bar 46 having scroll buttons 47 and 48, and a conventional window size button 49. An audio representation is displayed with marks 50 on the display and marks 51 on the scroll bar indicated by the arrows.

In accordance with a further feature of the invention, means can be provided to execute a relativity controller function. This can be implemented automatically whenever a marking of salient points is made, or it can be implemented by, for example, pointing to the scroll bar, clicking, and then dragging the mouse perpendicular to the scroll bar, or it can be implemented, as explained later, by clicking on a special button added to the scroll bar and then dragging the mouse. In the flow charts described later, an option key is also used when clicking on the scroll bar. When the relativity controller function is activated, the computer modifies the linear temporal representation of the sound into a non-linear representation, with the non-marked segments shrunken in time and the marked segments expanded in time into the resultant empty regions and thus magnified. This is also illustrated in FIG. 8 which displays a large portion containing marked segments 51 indicated by the arrows and unmarked segments 52. If the user then plays through that portion of recorded sound, it will play at normal speed through the marked segments 51, but will fast-forward at, say, twice the normal speed through the unmarked segments 52. In the resultant display, the marked segments 51, having been expanded in time, show actual digital samples, whereas the unmarked segments 52 condense the samples into black bars.

Figure 9:
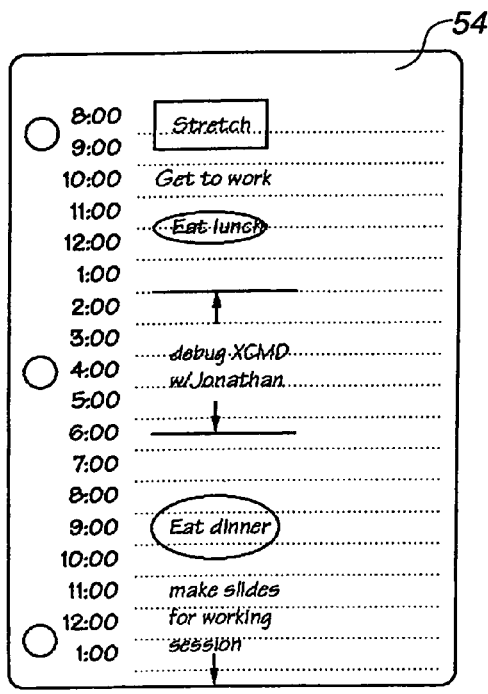
FIGS. 9-11 illustrate various screen displays of text information produced by one form of the computerized system of the invention.
Figure 10:
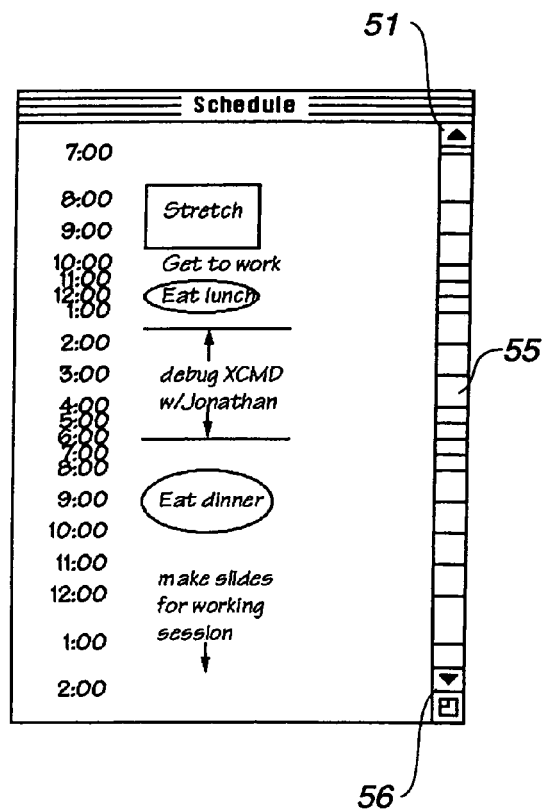

FIGS. 9 and 10 indicate the effects on a text document. FIG. 9 shows a day calendar 54 with a linear representation of time events from the hours of 8 a.m.-1 a.m. FIG. 10 shows the representation obtained in the invention. In this case, a vertical scroll bar 55 is at the right containing the usual scroll boxes 56 at top and bottom. In this case, the salient points as shown are determined by the user. The remaining times, being of less importance in this example, are shrunk temporally. No magnification of the salient times has occurred but now the range of times shown has expanded to 7 a.m.-2 a.m. The resultant non-linear representation is replicated in the scroll bar 55 by the density of the horizontal lines.

Figure 11:
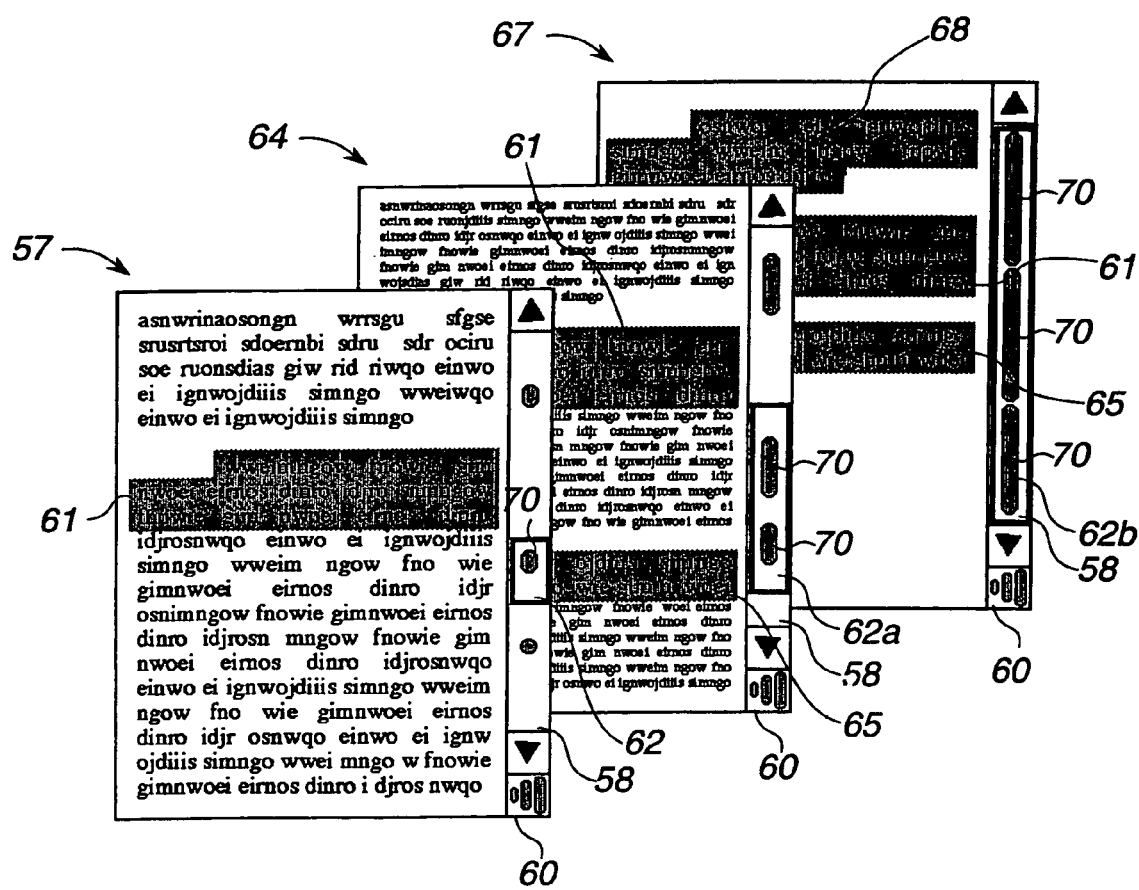

FIG. 11 shows another example of application of the invention to text documents. FIG. 11 depicts one page 57 of linear spatially depicted text, which would normally be displayed as a single screen with its accompanying vertical scroll bar 58 with, in this case, a relativity controller box 60. Three text lines have been highlighted 61 as salient. The thumb 62, it will be noted, has a certain size (height), showing as before one marked salient segment on the page. When the relativity controller box 60 is clicked on and dragged rightward (toward the right side of the mouse pad), reference numeral 64 now shows the resultant screen display. Note now that the non-salient (non-highlighted) parts of the original screen 57 have been shrunk or condensed, so that now not only the original marked segment 61 is visible but also a second marked segment 65. Note further that the thumb 62a has enlarged to indicate the increased number of visible salient points. Screen 64 also shows how the unmarked "insignificant" text above and below the salient segments shrink up, and disappear in the third screen 67 shown at the right when scaling perspective, as other salient segments 68 come into view. Thus, when the second screen 64 has segments 61,65 marked, and when the controller box 60 is clicked on and again dragged to the right, more of the succeeding text can be displayed as illustrated in the third screen 67. Again note the increased size of the thumb 62b. In all three cases, the scroll bar 58 illustrates at 70 the scope of the salient segments and thus the modified text representation. The text abstract generated 67 in this process could be presented in library search systems, so that the user could then more readily scan and expand the view to give more details as desired.

Figure 12:
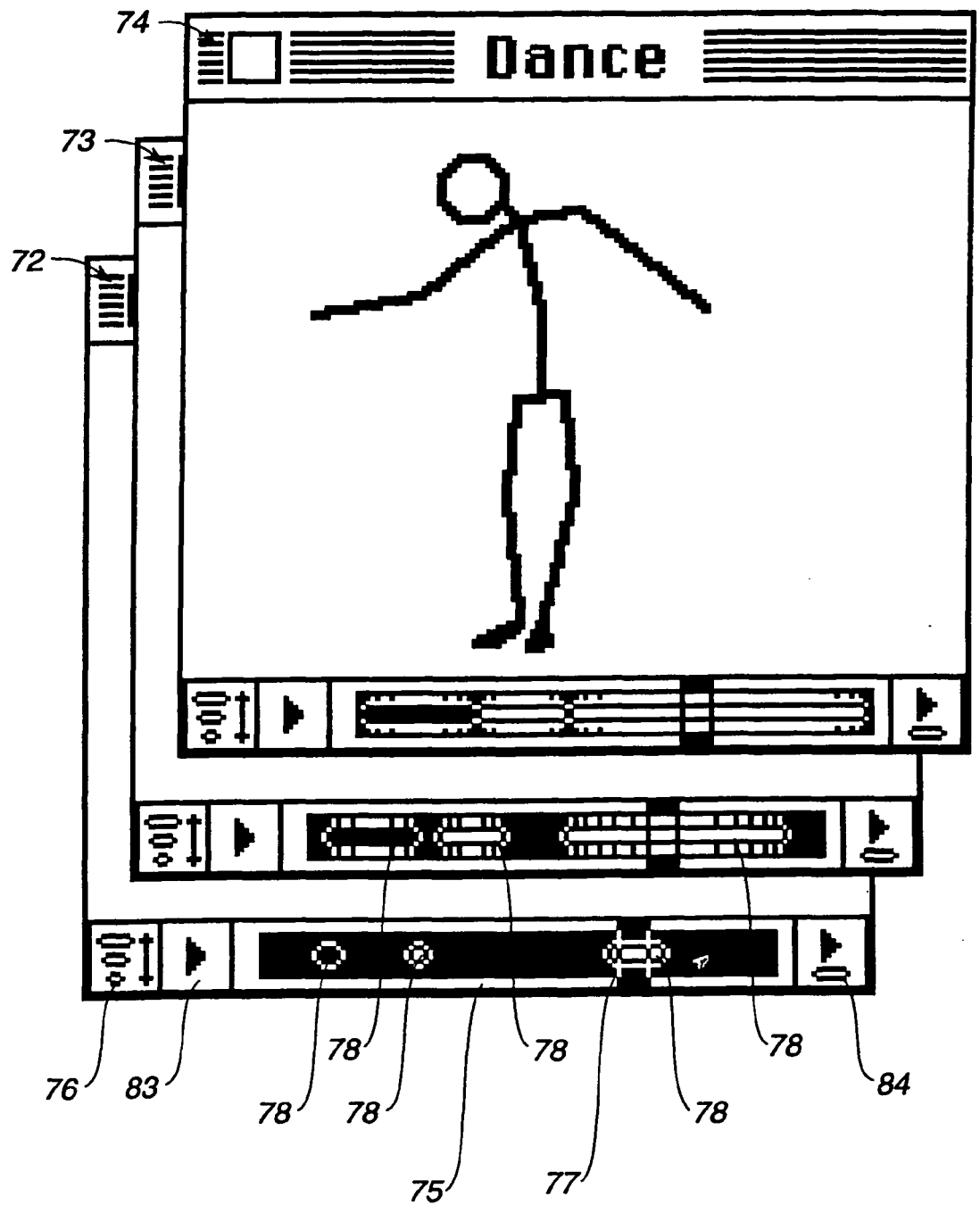
FIG. 12 shows various screen displays of video information produced by another form of the computerized system of the invention.
Figure 13:
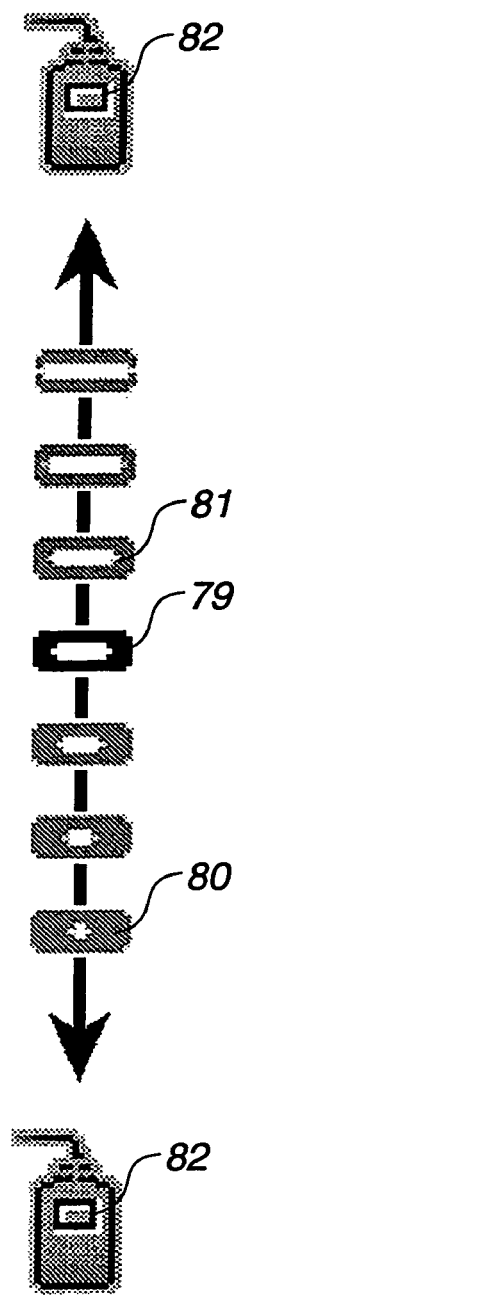
FIG. 13 illustrates, schematically, various cursor shapes produced by a system of the invention.

FIG. 12 depicts application of the invention to video, for example, with Apple QuickTime video. QuickTime allows a user to play through a video presentation with a window just like playing a video tape on a VCR, except that QuickTime also allows editing of one or more of the frames making up the video. In this case, three successive screens 72, 73 and 74 are depicted, only one of which would appear at a time in the window. Each screen has its accompanying scroll bar 75 having a relativity controller box 76 at the left end, and a thumb 77 showing the temporal position of the video frame being displayed. Note also markings 78 displayed on the scroll bar 75 to represent marked segments. This figure and FIG. 13 also illustrates user control of the magnification. Note that the relativity controller box 76 also shows different sized scroll representations to inform the user of its function. In this example, when the user clicks on the controller box 76, a cursor 80 is displayed on the screen. While holding down the mouse button, when the user moves his or her mouse upwards, represented by image 82 (which is not actually displayed) the cursor 80 appearance changes with a larger white space region 81 to indicate higher magnification. During the movement, which is reversible—up for increased magnification, down for reduced magnification—, only one cursor image 79 is displayed, the full line image, representing the selected magnification level. The other grayed images are not displayed. When the user releases the mouse button, the selection of the magnification level is completed and may be stored with the data structure representation of the video if desired. In this instance, seven discrete levels of magnification are possible, but the invention also contemplates continuous change in magnification level. In the latter case, it is preferred to display a slide control with button, movable by the user to select the desired magnification level such as is used in the macintosh volume control.

Note, further, in FIG. 12 how the user's marked segments 78 of video get longer and the scroller (above and below mark) gets lighter as the spacing between marks condenses and darkens when the user scales perspective by moving the mouse upwards, toward the top of the mouse pad. Also, note how the scroll bar appearance changes to reflect the size of the marks in relation to the length of the whole video.

Marking of the video can occur in the same manner as the audio, such as pressing a mouse button when the cursor is on the video to mark the beginning of a segment and releasing the button to mark the end of the segment. The resultant marks can be displayed on the video, or in the scroll bar, or on both.

In this aspect of the invention, not only is the user allowed to select and display the scope of salient segments, but as a further feature allows the user to vary the degree of magnification of the salient segments. It will also be understood that, besides size, other scroll bar changes can be used to represent the salient segments and/or different levels of magnification. For example, different colors can be used to represent on the scroll bar the salient and non-salient segments selected at different times or by different users, and if desired the intensity of the color used to illustrate level of magnifications.

Figure 14:
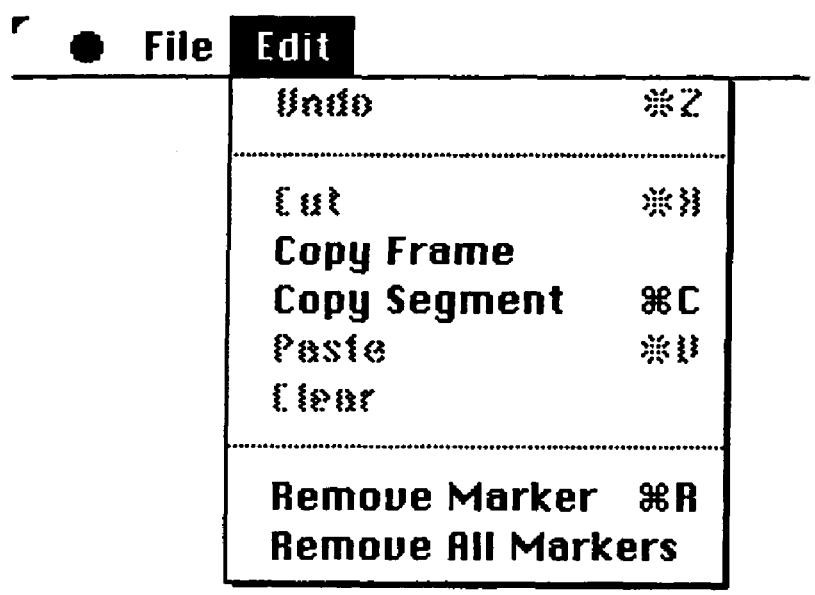
FIG. 14 shows a screen menu that can be used with the system of the invention.
Figure 15:
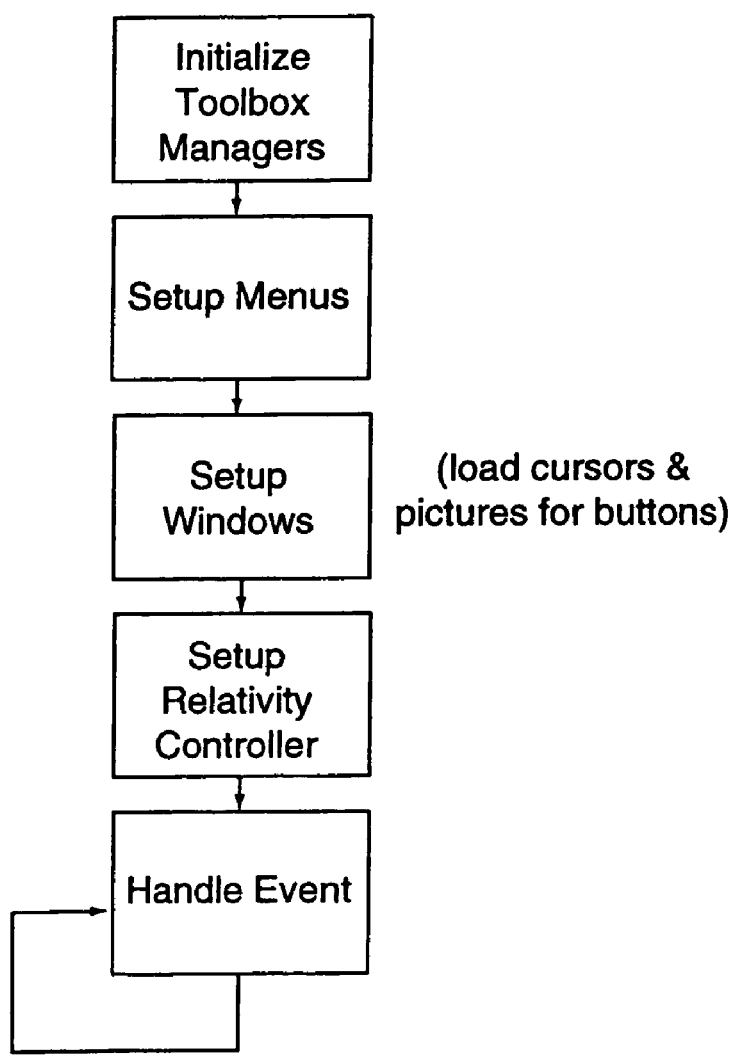
Figure 16:
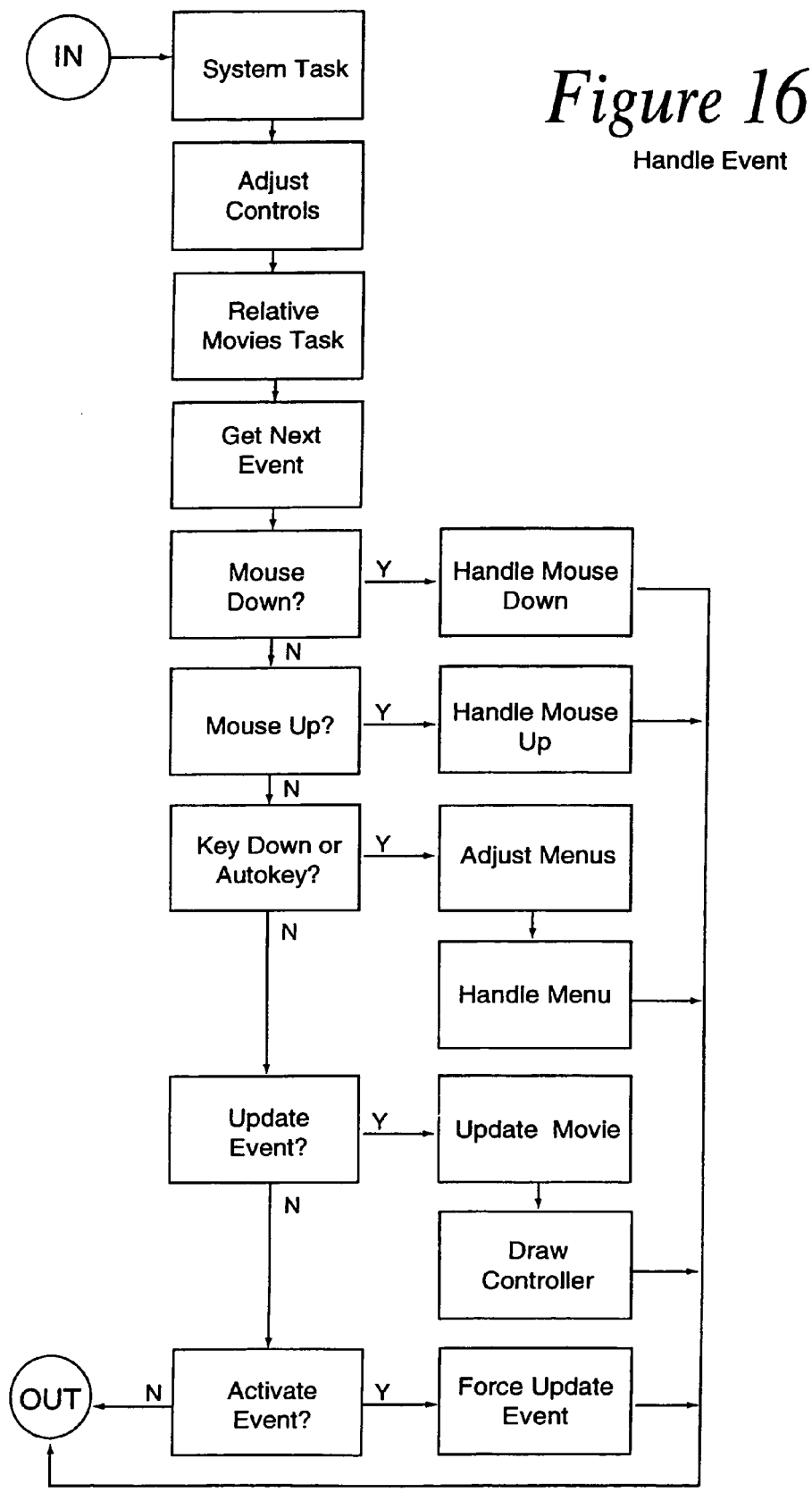

The relativity controller application program will not interfere with the normal functions available in programs such as Apple QuickTime, while providing the additional functions described above. A listing of available functions for a preferred embodiment, which is not meant to be limiting, appears below, to be used with, for example, an EDIT menu as depicted in FIG. 14.

The edit menu allows the user to perform the normal functions on displayed information, as well as the ability to remove any marks made by the user on the screen display or the scroll bar. what appears below is a description of functions available to the user to carry out the invention. One way of implementing these functions in software are shown in the program flow charts illustrated in FIGS. 15-33. The functions included are for the video of FIGS. 12 and 13, but obviously can be modified and applied to audio or text. Also, in the description of these button functions, the relativity controller has also been referred as the scale perspective button.

Adjust position in movie time
click or drag mouse in scroll bar
Play & Pause movies from/to anywhere in movie (beginning <-> end)
press Play/Pause button
Mark segments of movies (while playing or paused)
press mouse (and hold down for duration of mark) within movie window
Review individual marked segments
click on a mark, and press Play Segment button
Adjust relationship between marked and unmarked segments
click on Scale Perspective button and drag mouse vertically (up into movie→relative scaling; down out from movie→absolute scaling)
option-click on slider thumb and drag mouse vertically (one step navigation to/from specific point in time & resolution)
Remove 1 or all marks in movie
click on a mark, and select Remove Marker (cmd-R) from Edit Menu
click on a mark, gesture (press, drag, lift) left with mouse within mouse within movie window
select Remove All Markers from Edit Menu
Change current marking color
use Apple 'Color' control panel to choose Selection Color (may facilitate collaboration of groups of people (diff. color per person))
Copy frames or marked segments to the Macintosh clipboard & other applications
select Copy Frame or Copy Segment (cmd-C) from the Edit Menu
Save document marks and perspective
select Save (cmd-S) from File Menu
High Speed annotation:
adjust Scale, press Play, then mark segments
can also be used by scaling to fast-forward to stop when hits a marked segment.

As is conventional in the Macintosh, the left button 83 (FIG. 12) on the scroll bar represents the play button which then converts to pause during play. The right button 84 can thus be used by clicking as a play segment or play mark button.

Various features of the invention as well as modifications are also indicated below:

Marks can be drawn inside scroll bar to keep desktop real estate usage down
Marks can be colored to indicate different users or states of notation
Scale Perspective cursor changes (while adjusting scale) to reflect size of segments in scroller (also dynamically changing)
Relationship between marked and unmarked segments is reflected in:
  speed of playback (unmarked segments speed-up with perspective relativity)
  size of marks in scroll bar (unmarked segments shrink in proportion to play speed) (marked segments enlarge to fill the remaining scroll bar space)
  color of scroll bar area: indicating density of scale (looks like depth of field) (unmarked segments get darker in proportion to size in scroll bar & speed) (marked segments get lighter in proportion to size in scroll bar)
At more relative scale, user has higher resolution access to time in that area (moving scroll thumb passes through less frames per pixel)
Overlapping marked areas join to form single marks (with 1 scope & 1 color if desired)
  if new mark falls between original startTime and endTime, then newColor=¼ (new)+¾ (orig.)
  if new mark overlaps original startTime or endTime, then newColor=(orig.+new)/2
  if new mark overlaps both original starttime and endTime, then newColor=¾ (new)+¼ (orig.)
'Save' menu item is enabled when user modifies marks or scale (perspective is part of the document)
Marks & scale are saved inside movie files as QuickTime 'user data' Mark data consists of scope (startTime, endTime) and color when chosen (RGB)
Gives audio feedback when removing marks from segments
Marked movies have unique 'stamped movie' icon on Desktop Also listed below is a summary of a few data types with examples of how the invention can be applied:

| DATA TYPE: | APPLICATIONS: |
|---|---|
| Schedules | personal profile based time scaling |
| Sound | annotation & editing |
| Video | annotation & editing |
| Text | data retrieval & abstract searching |
| CAD & PICT | scaling space to dimensions of experiential perspective |

Implementation of the various forms of the invention will be evident to those skilled in the art. Reference is made to "Inside Macintosh", (published by Addsion-Wesley) which provides the code for developers for various kinds of interface constructs, such as scroll bars, control bars, slide controls, and boxes used therein, as well as how to display them in different colors or appearances, and how to invoke program routines when a user clicks on a box or icon, and how to change the appearance of an icon when a routine is executed. See, also, U.S. Pat. No. 4,931,783, which describes operation of a system with the Apple Graphical User Interface, whose contents are herein incorporated by reference.

To further assist those skilled in the art, FIGS. 15-33 are flow charts of one form of program suitable to implement a user selecting and displaying in accordance with the invention desired salient of a video presentation.

Figure 17:
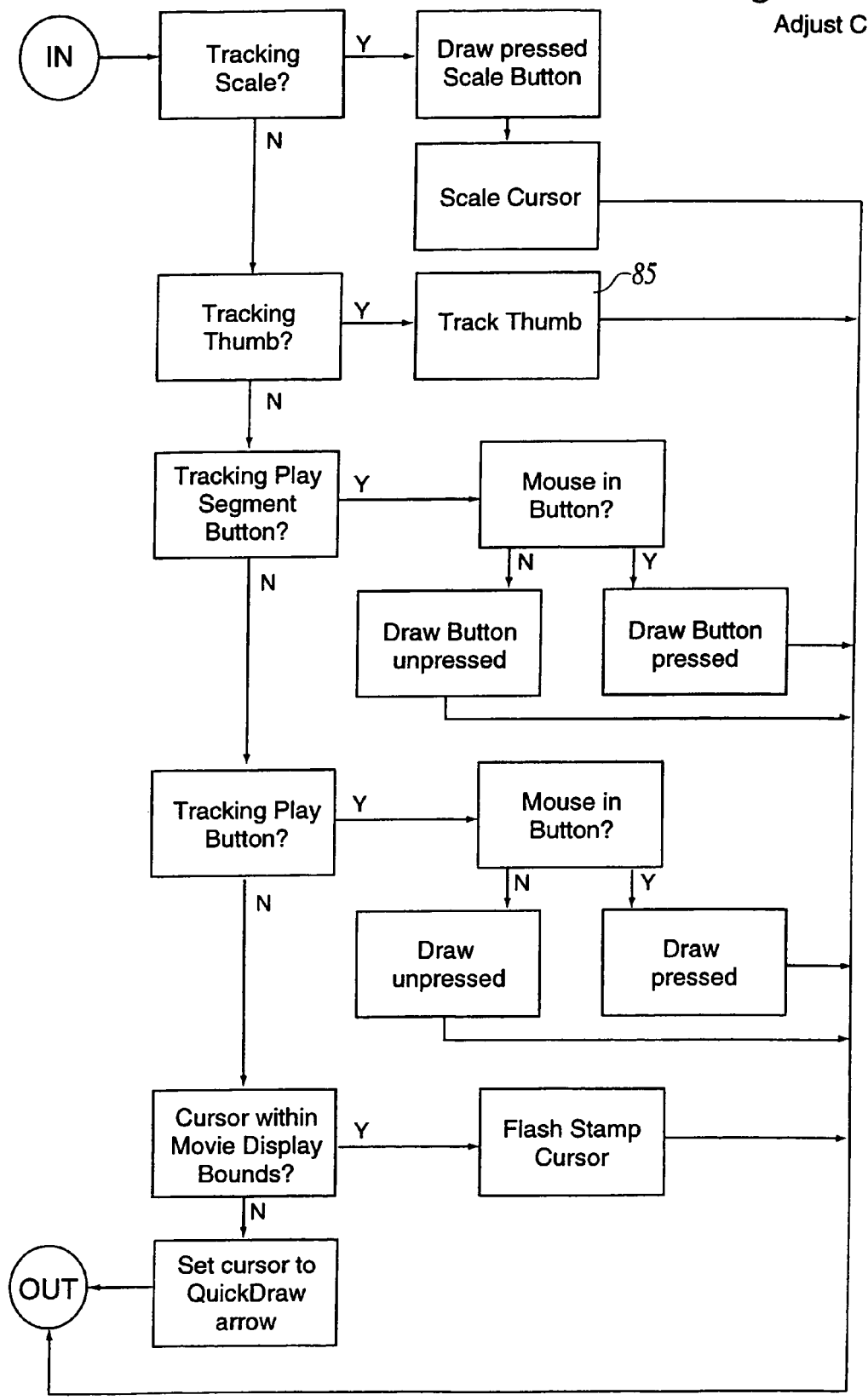
Figure 18:
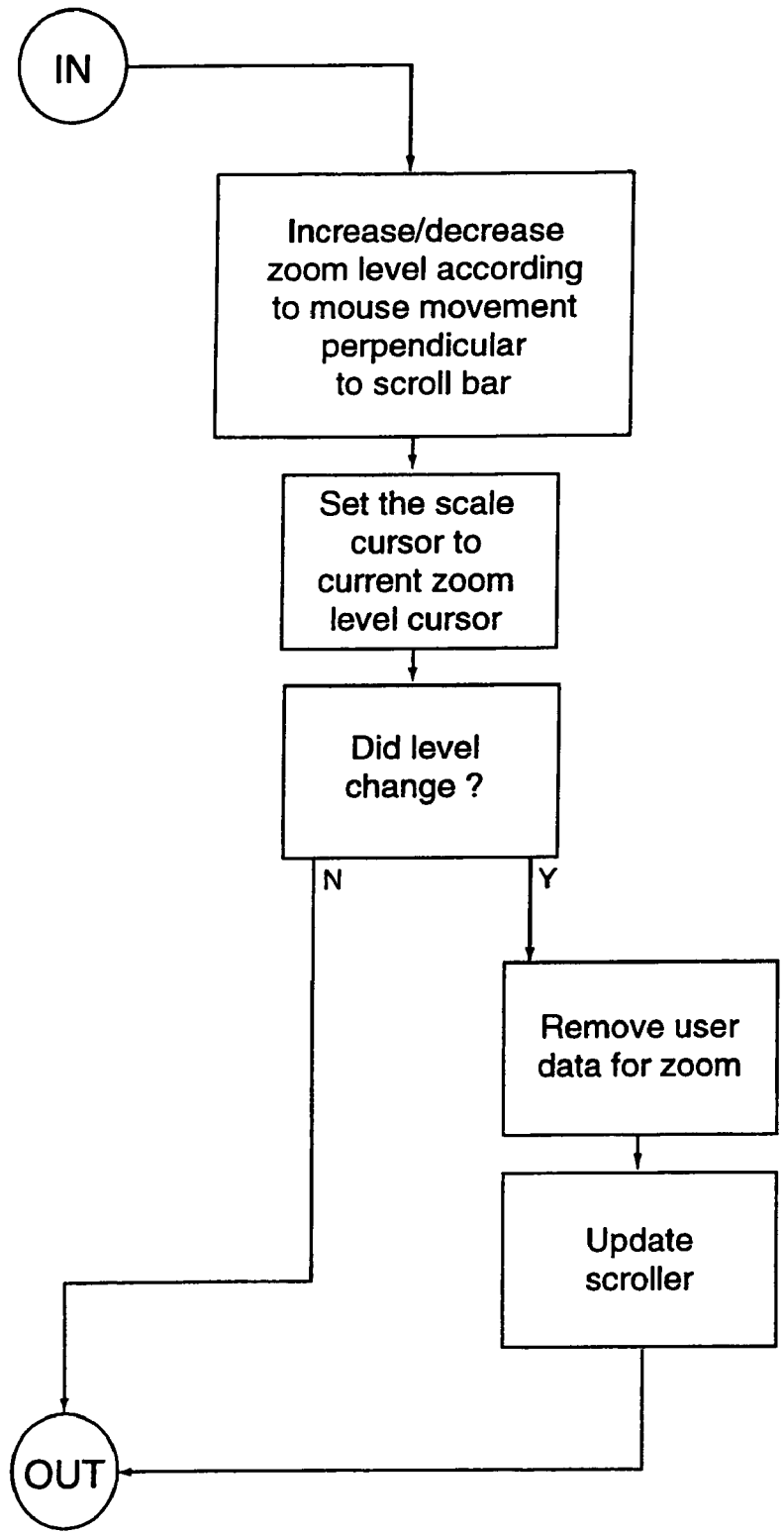
Figure 19A:
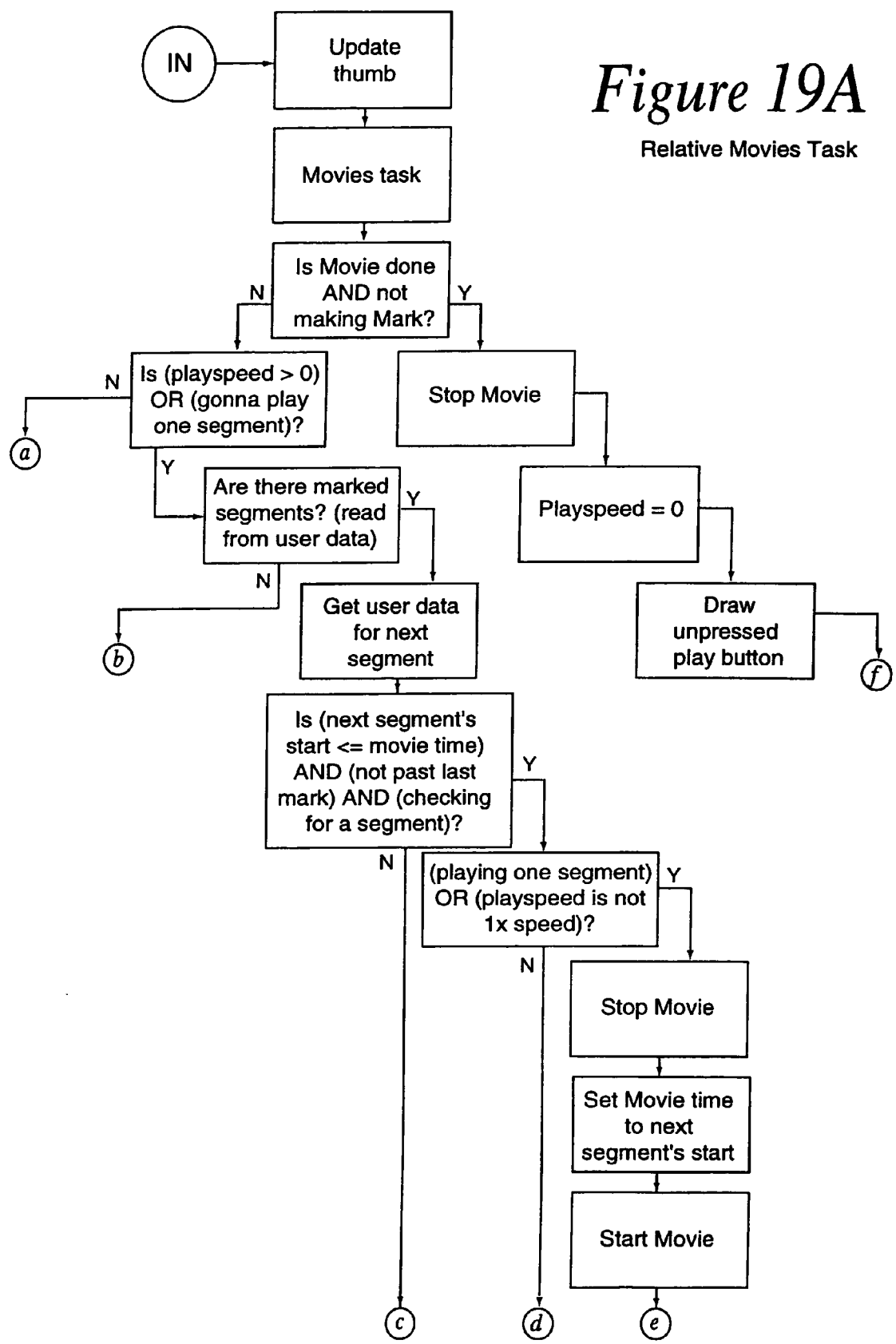
Figure 19B:
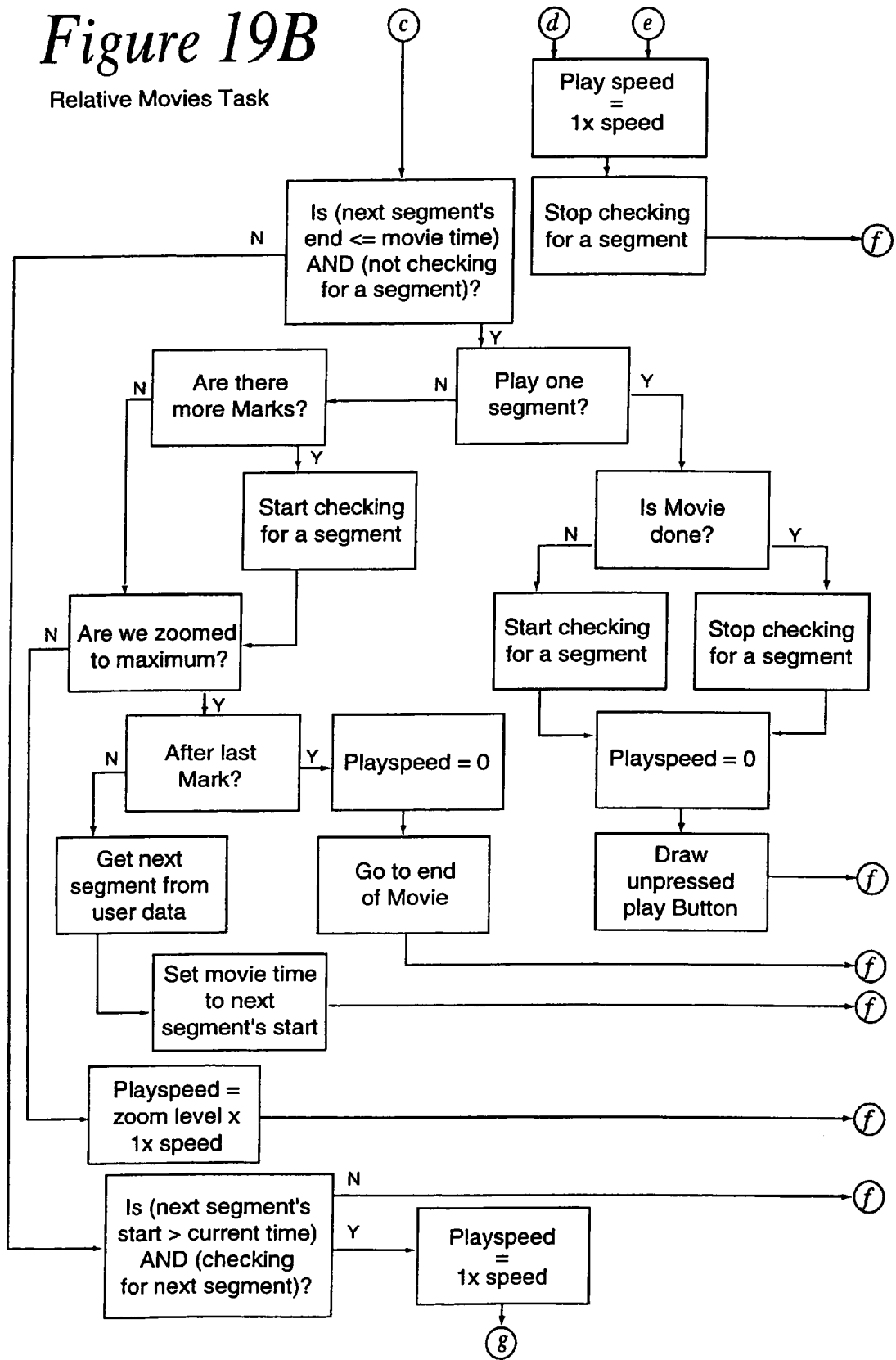
Figure 19C:
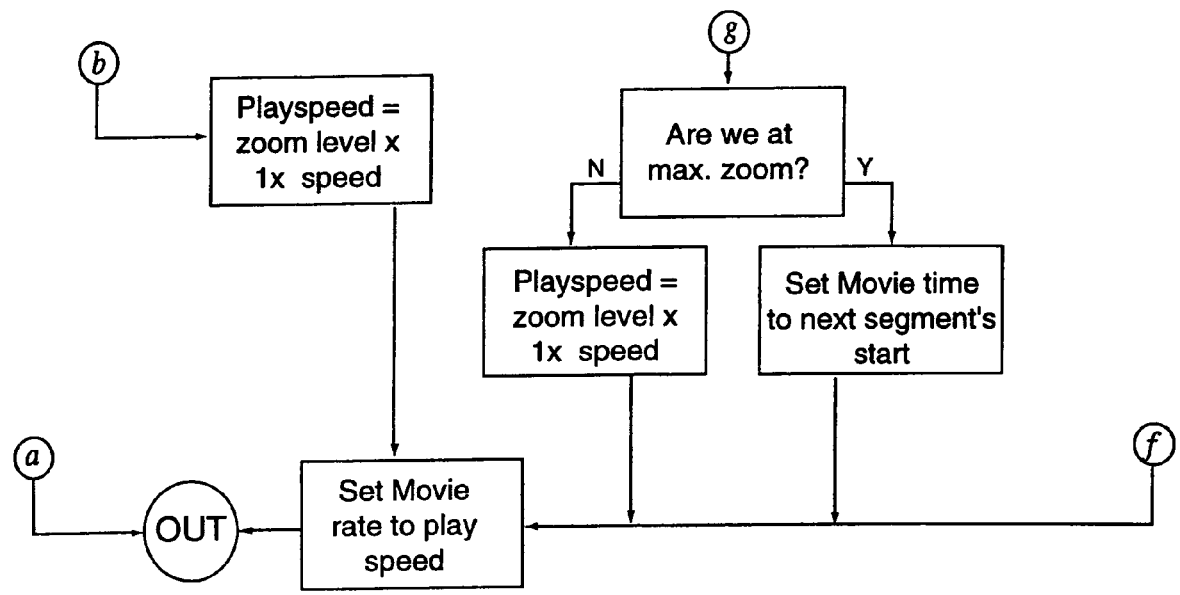
Figure 20:
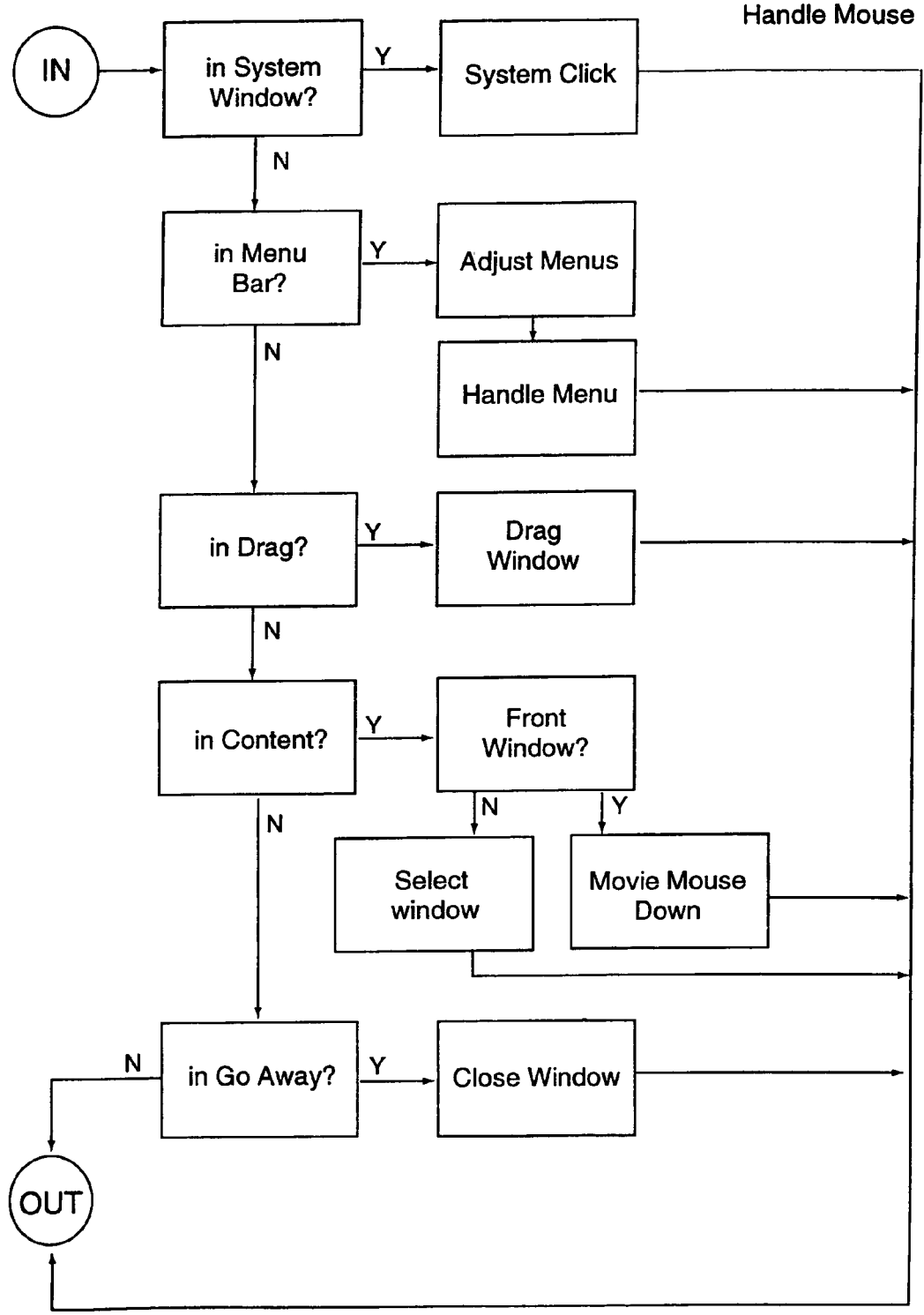
Figure 21:
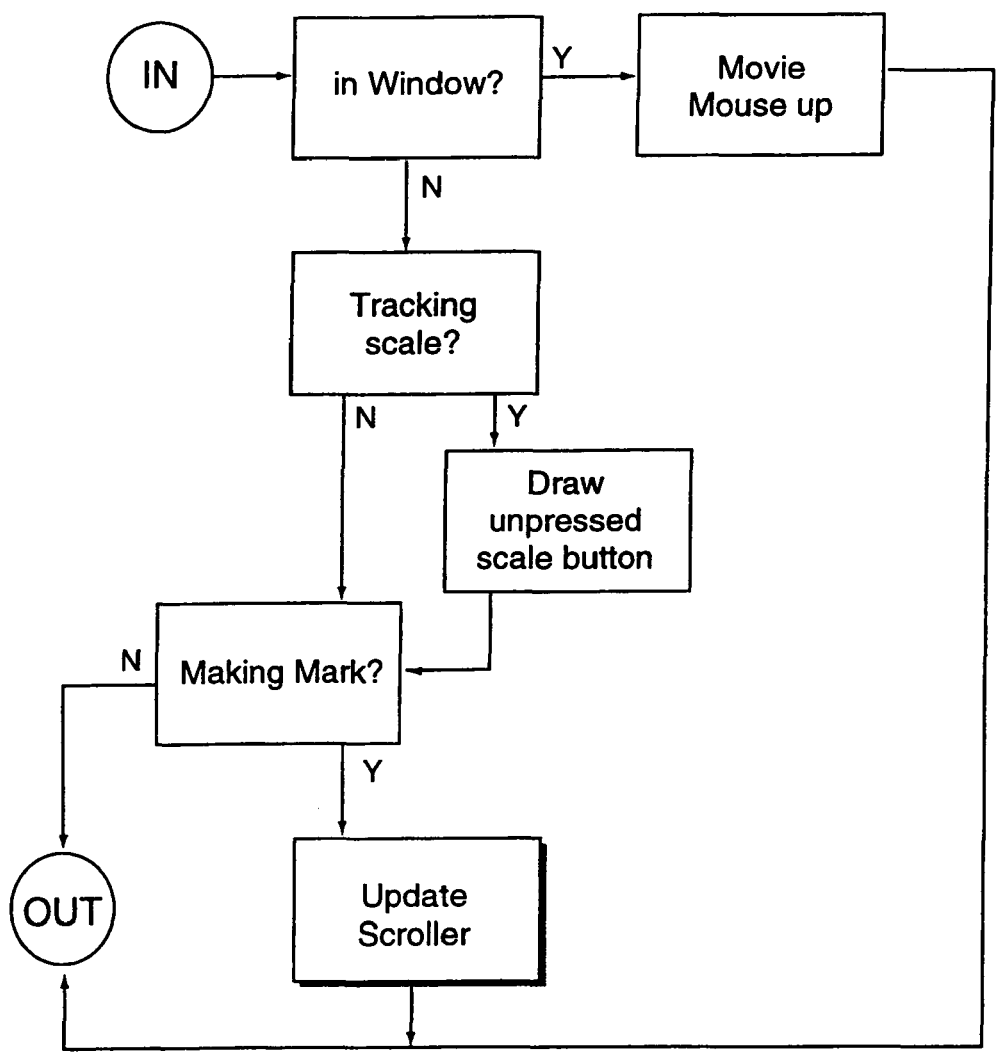
Figure 22:
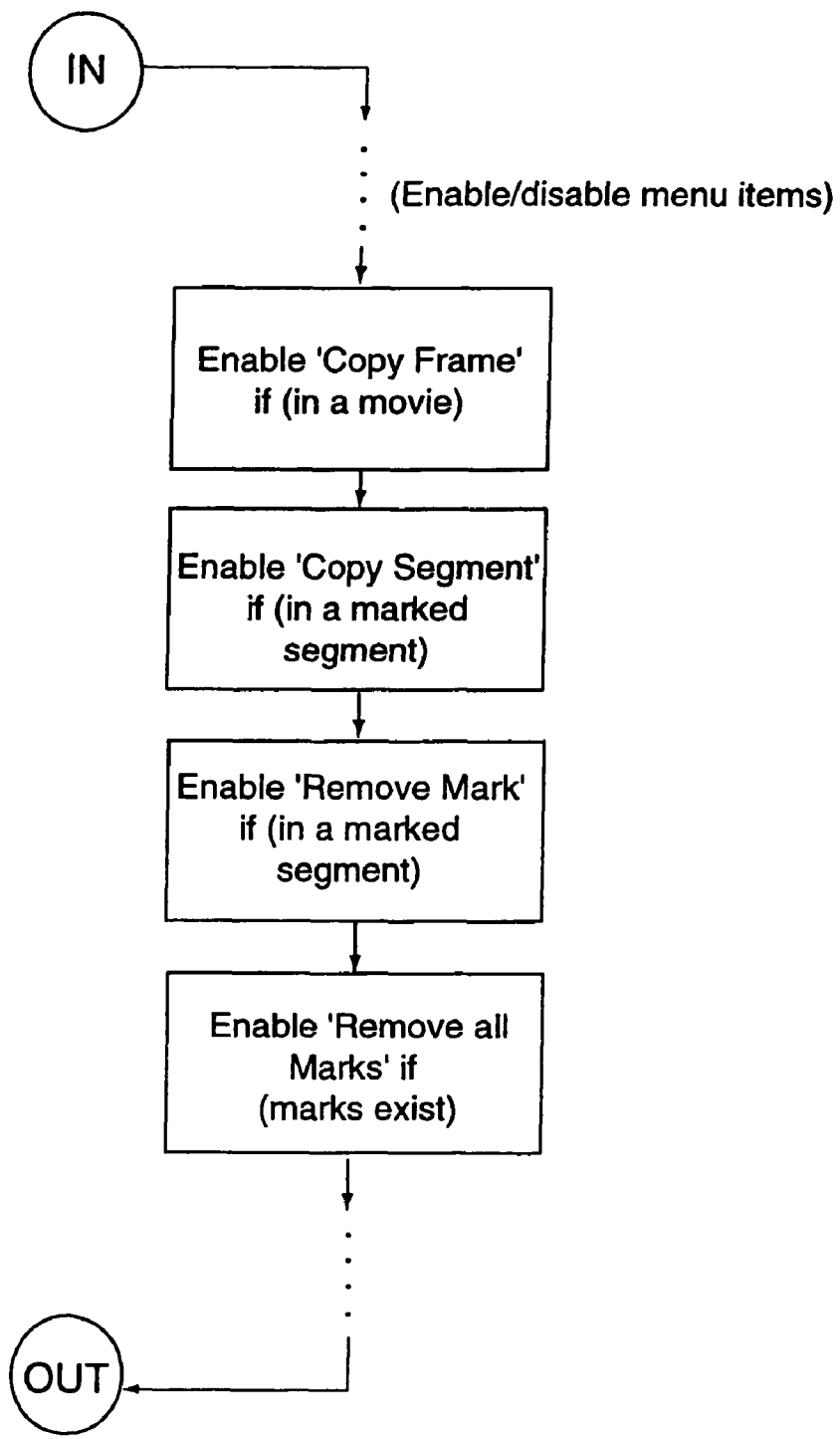
Figure 23A:
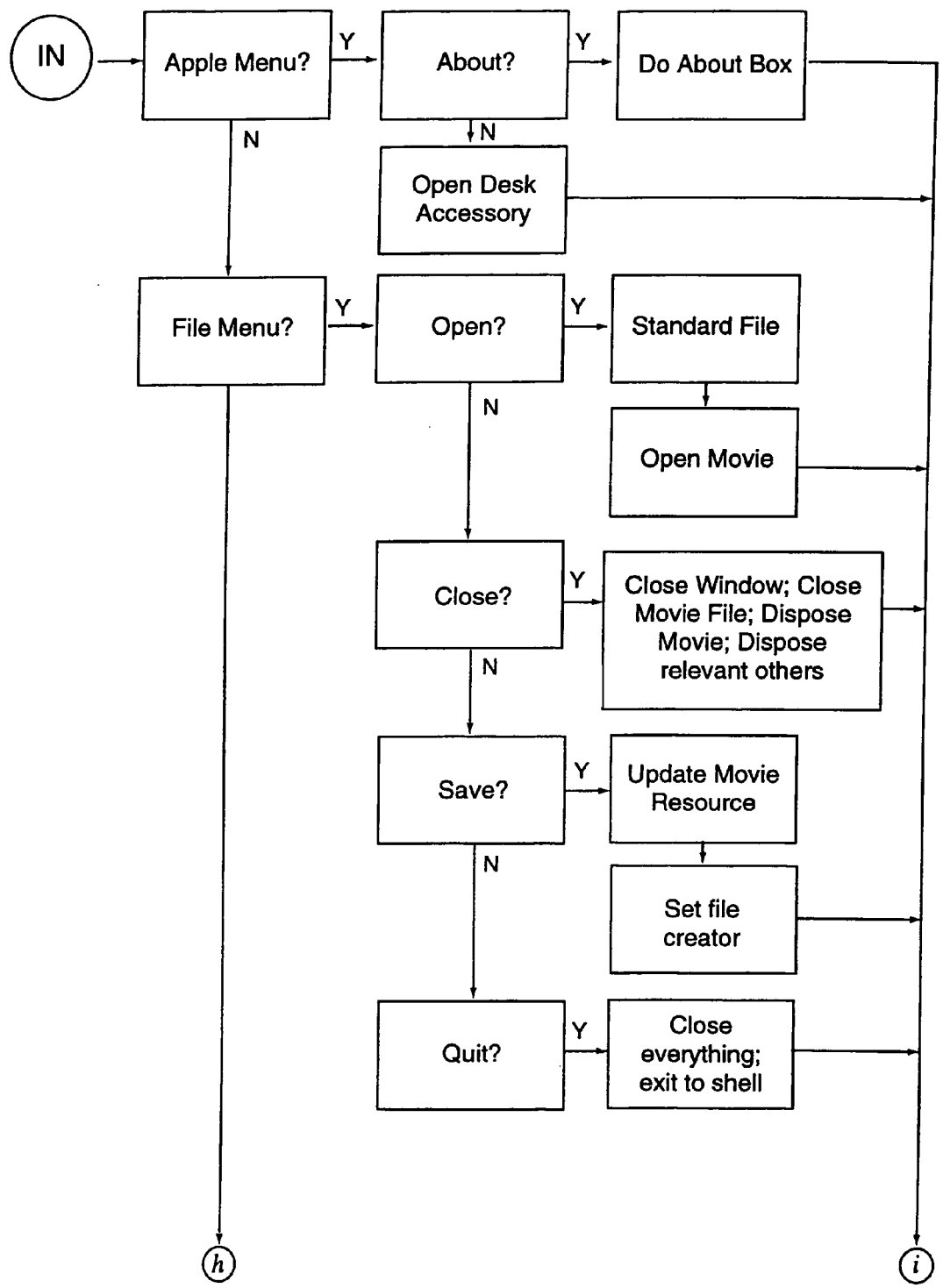
Figure 23B:
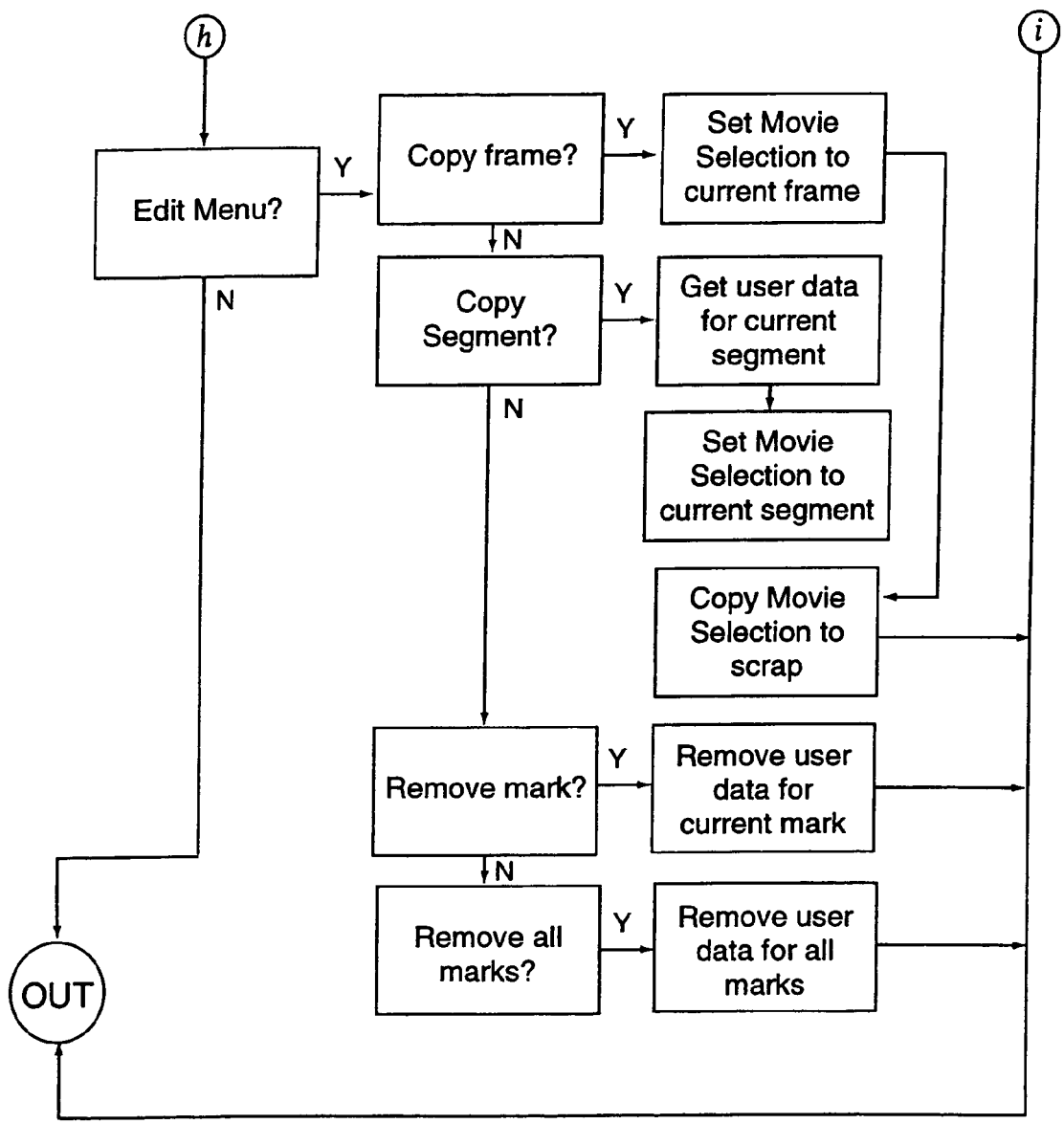
Figure 24:
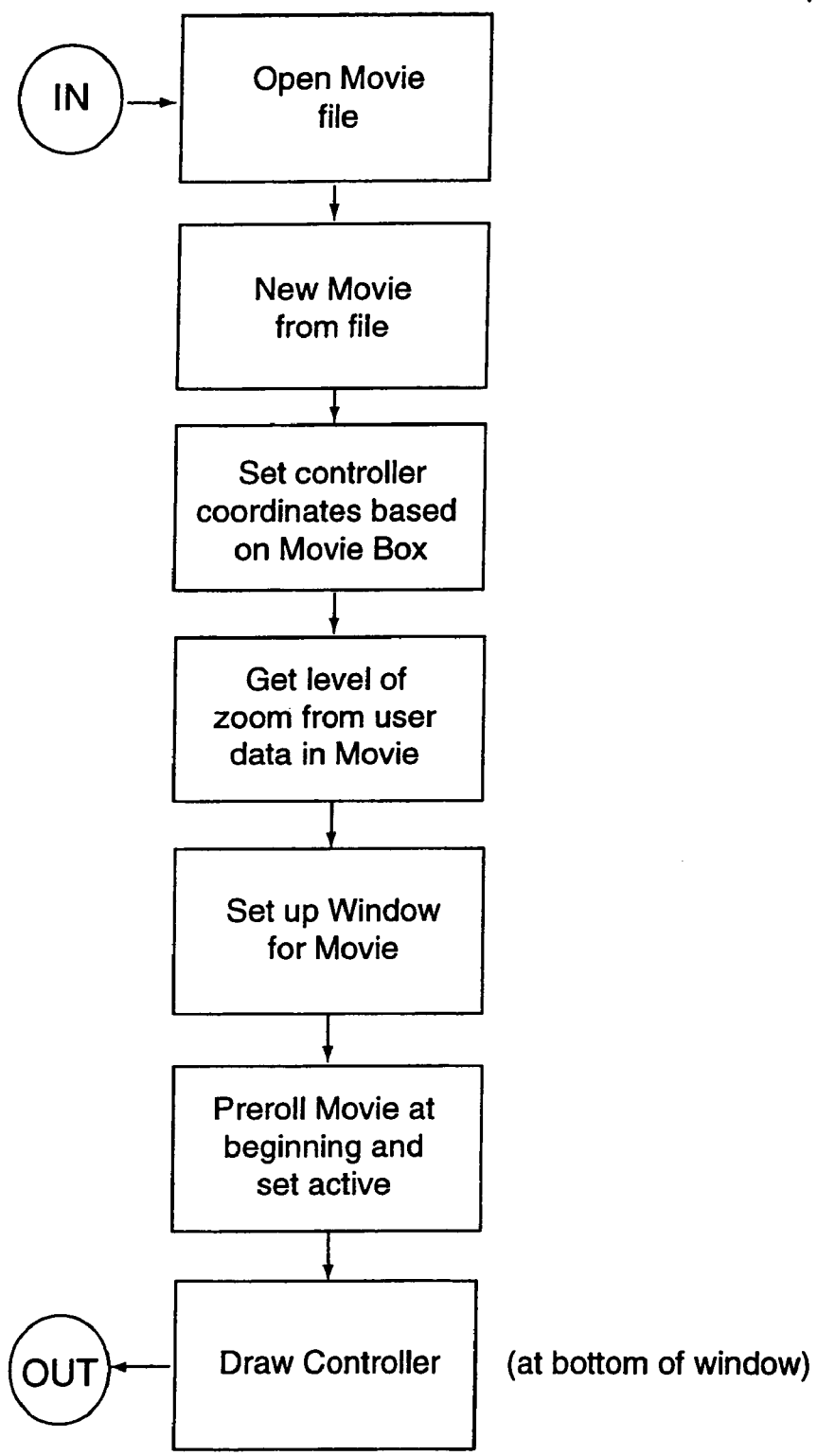
Figure 25:
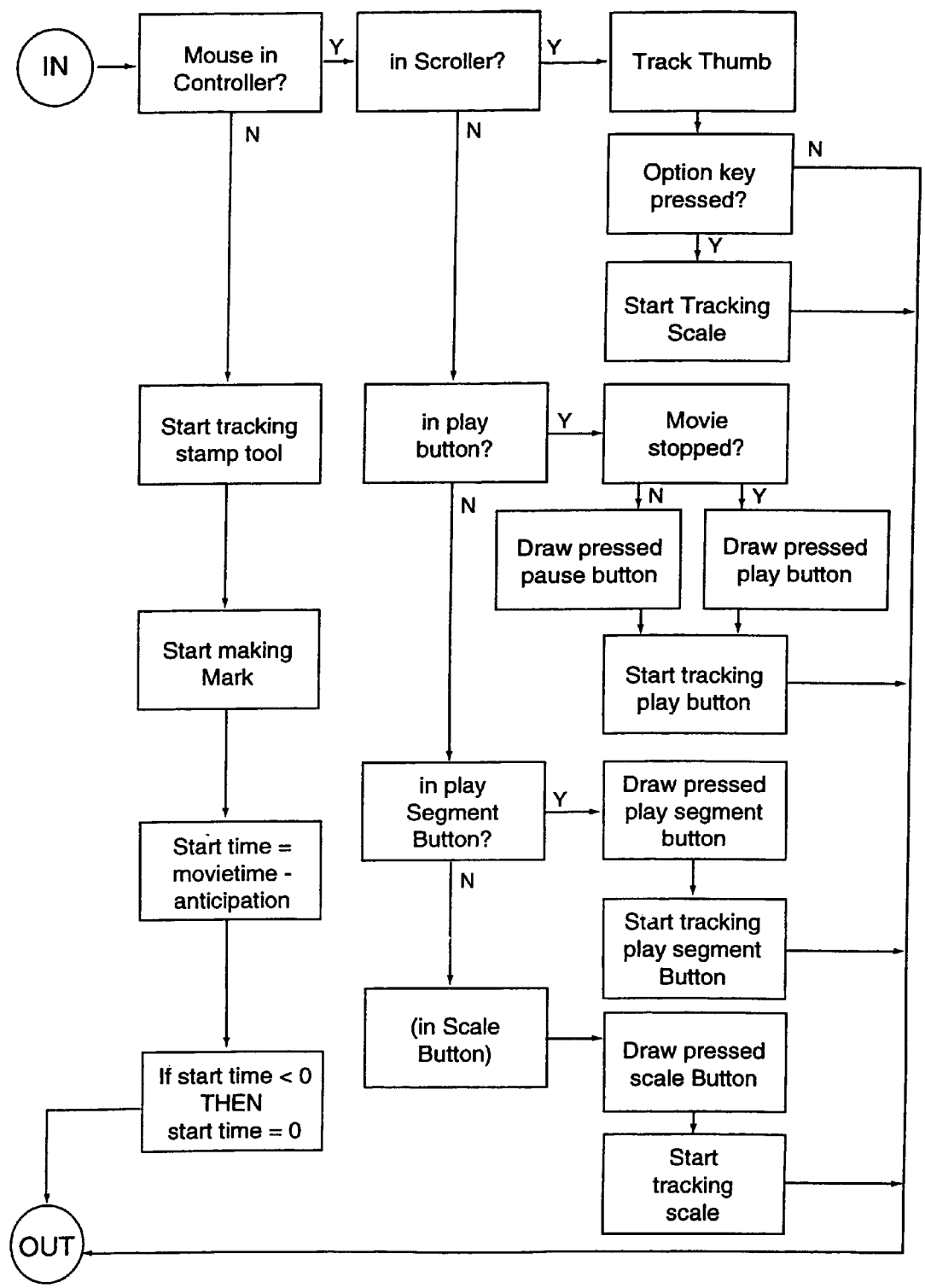
Figure 26A:
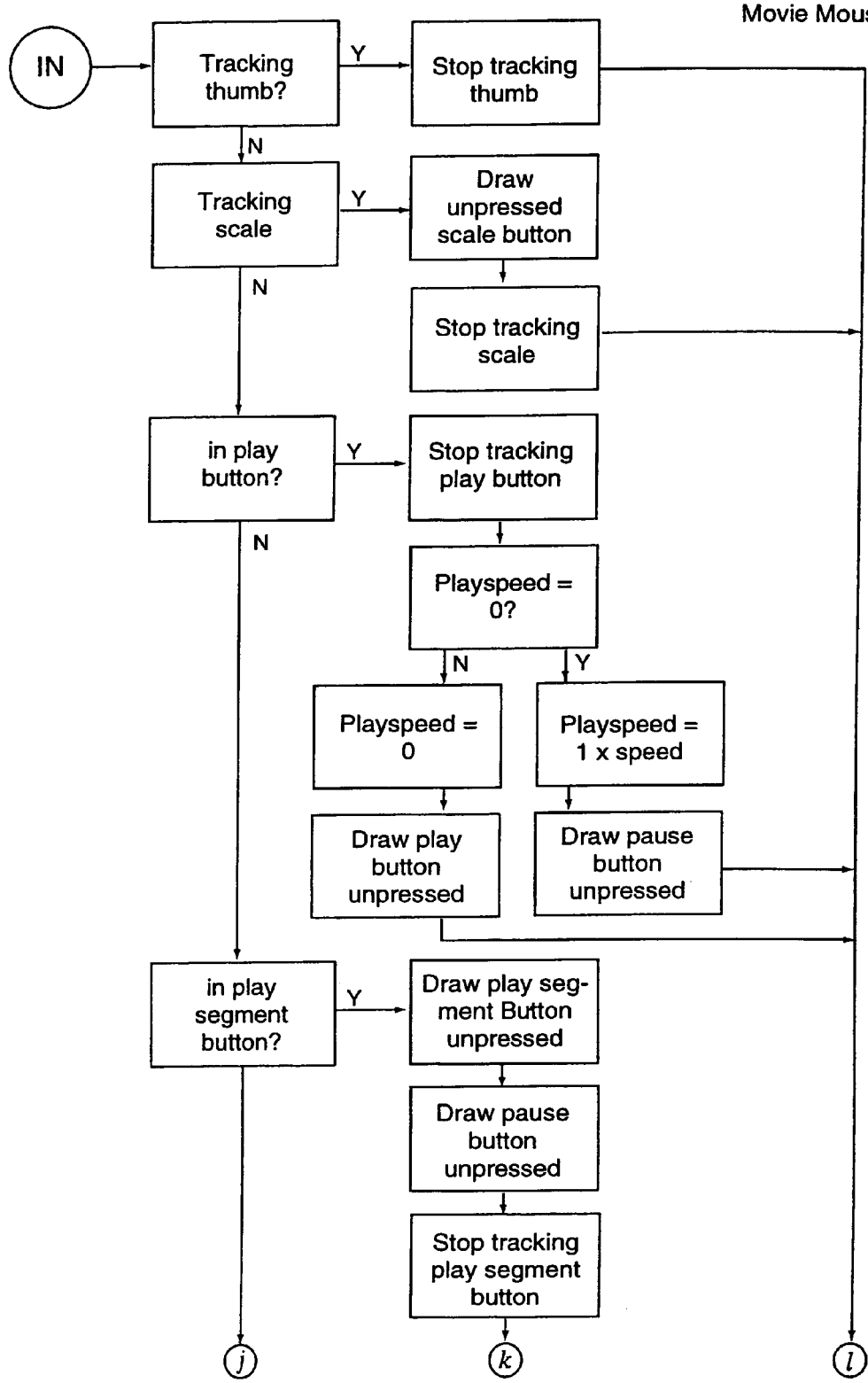
Figure 26C:
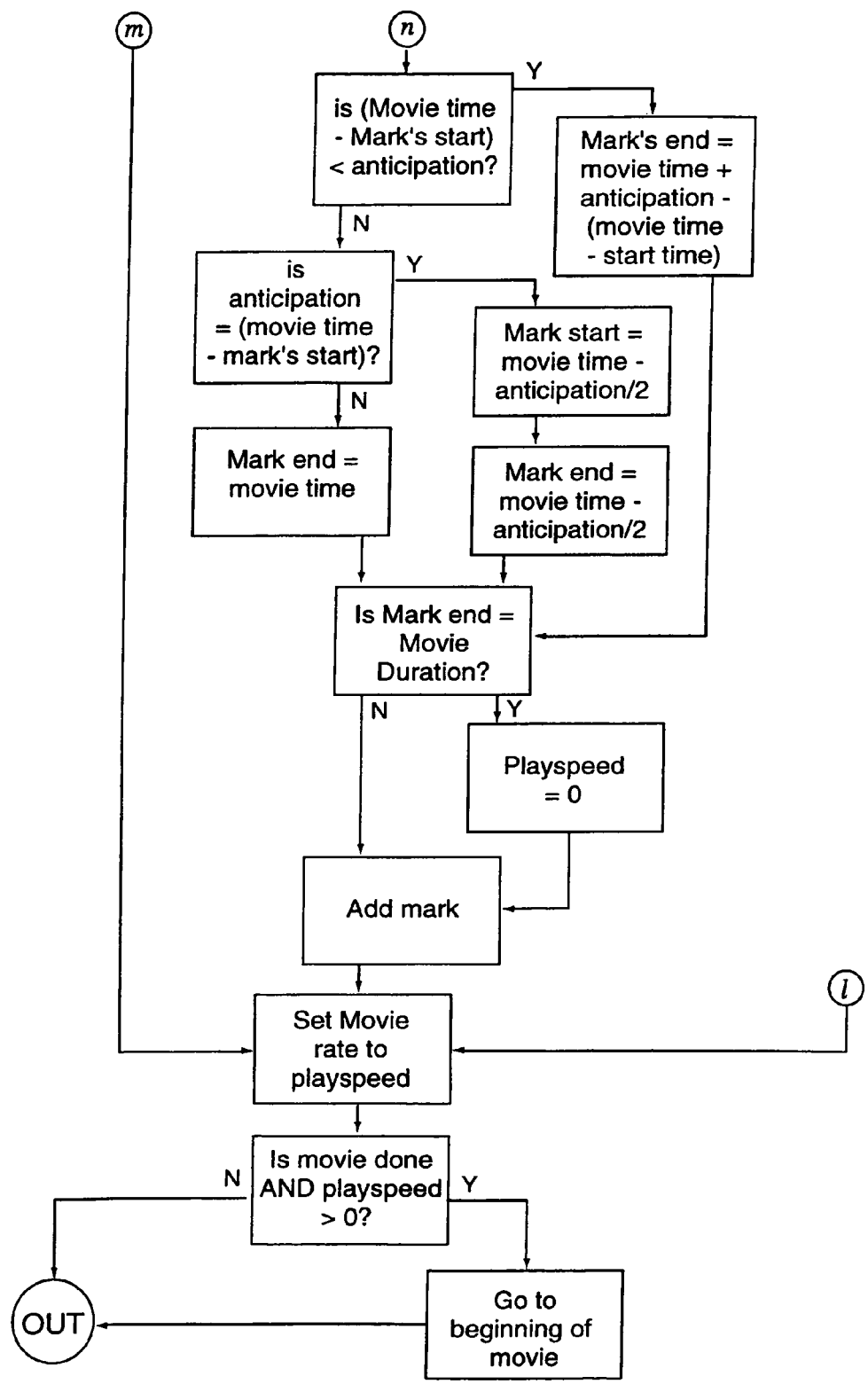
Figure 27:
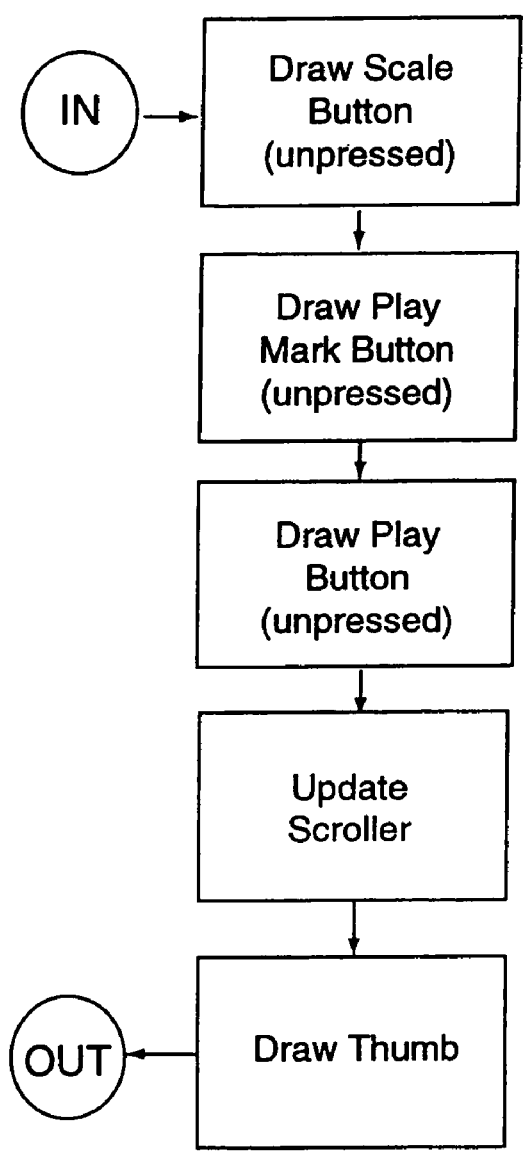
Figure 28A:
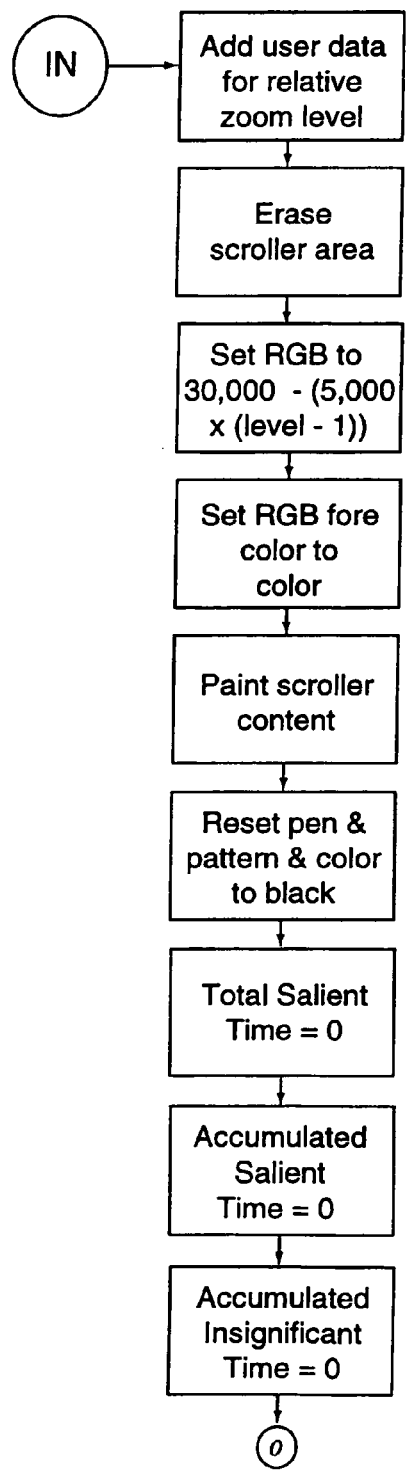
Figure 28B:
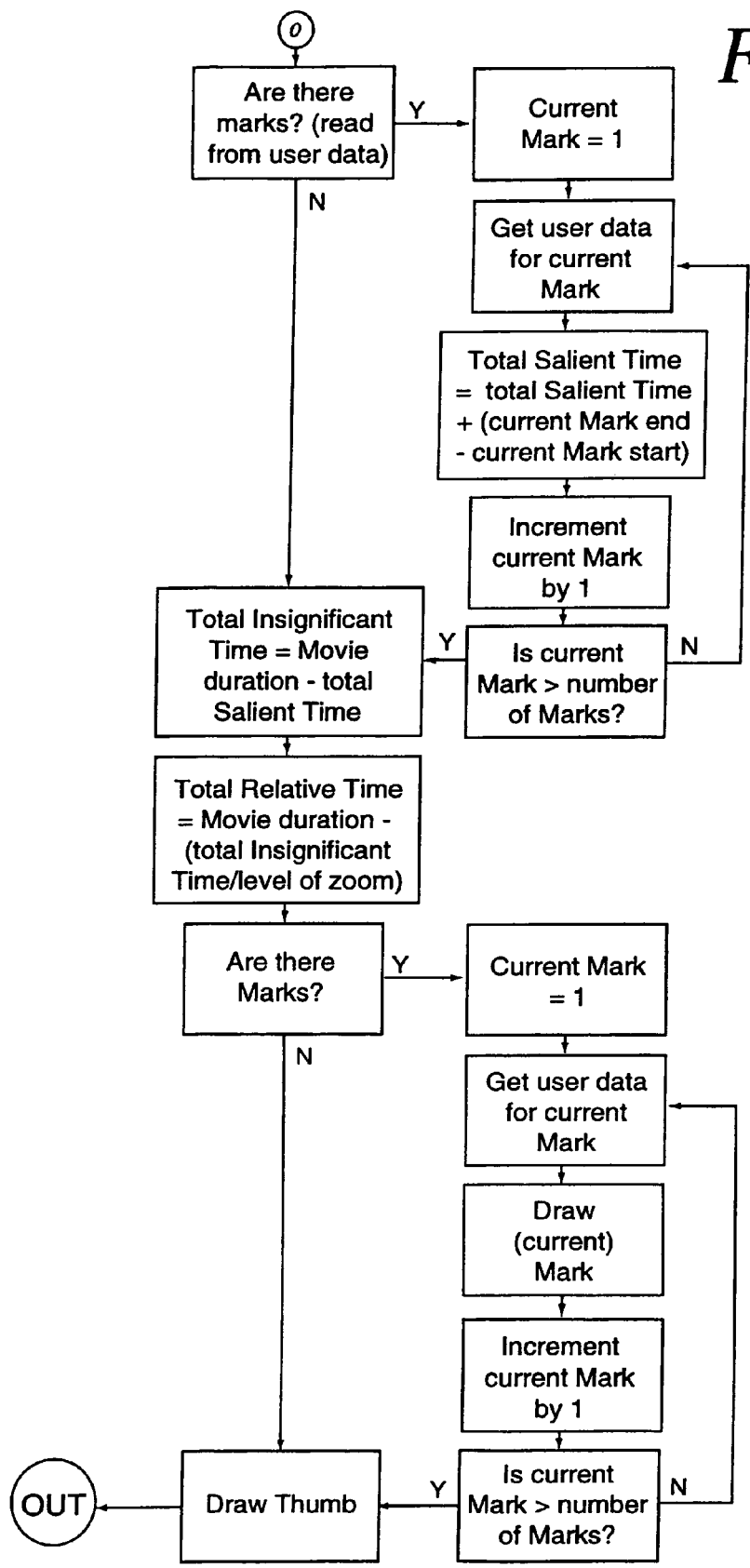
Figure 29A:
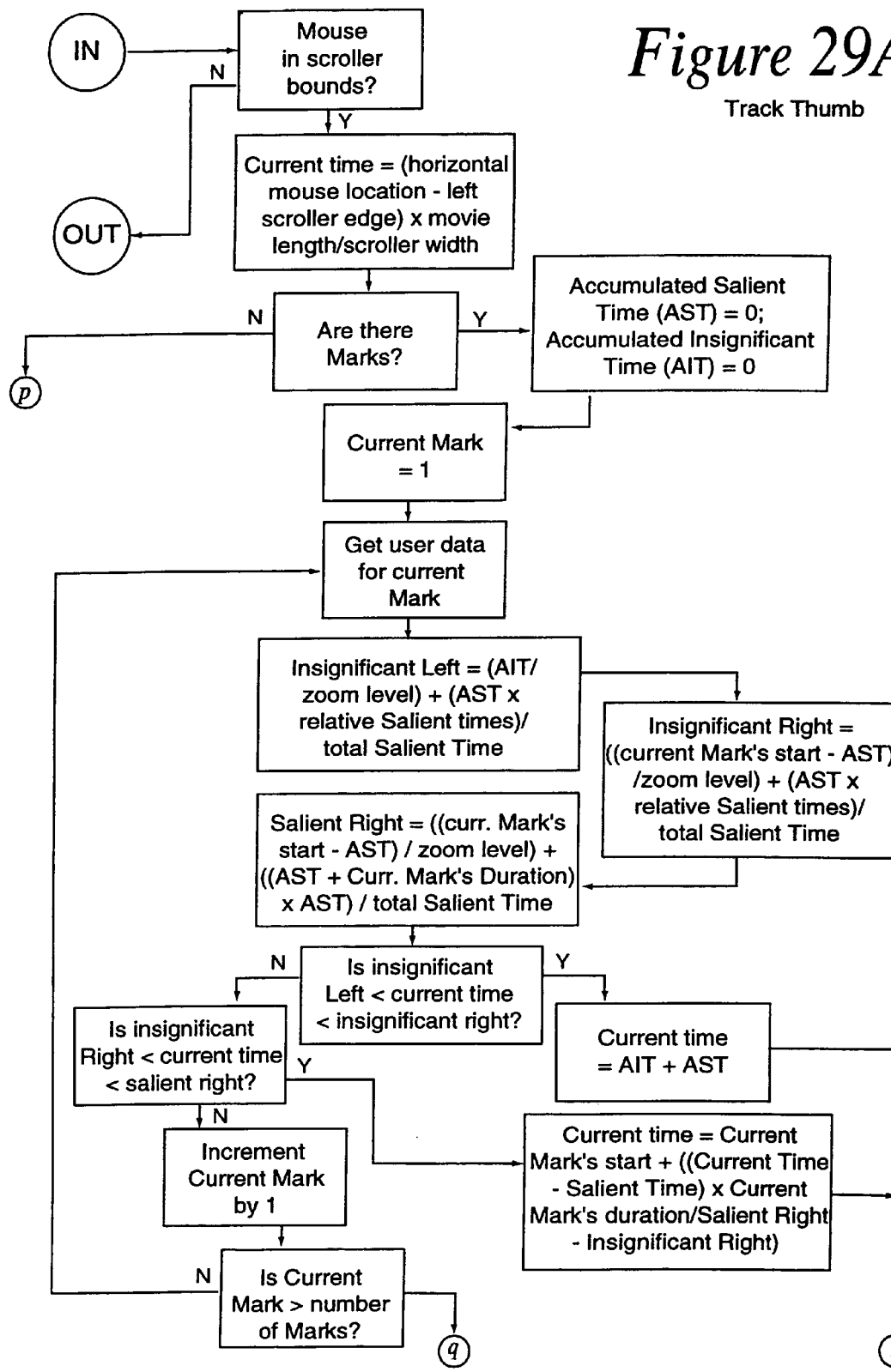
Figure 29B:
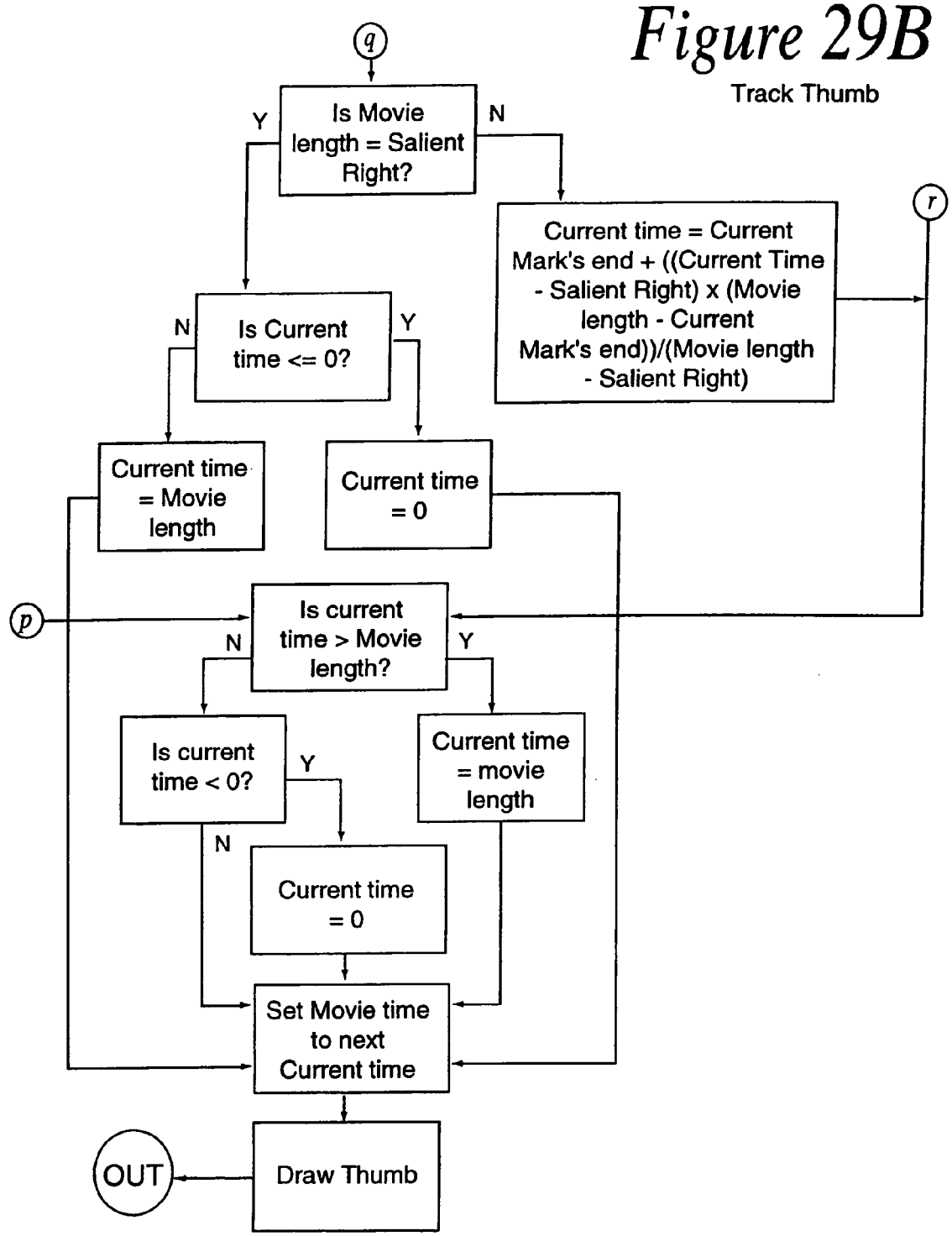
Figure 30A:
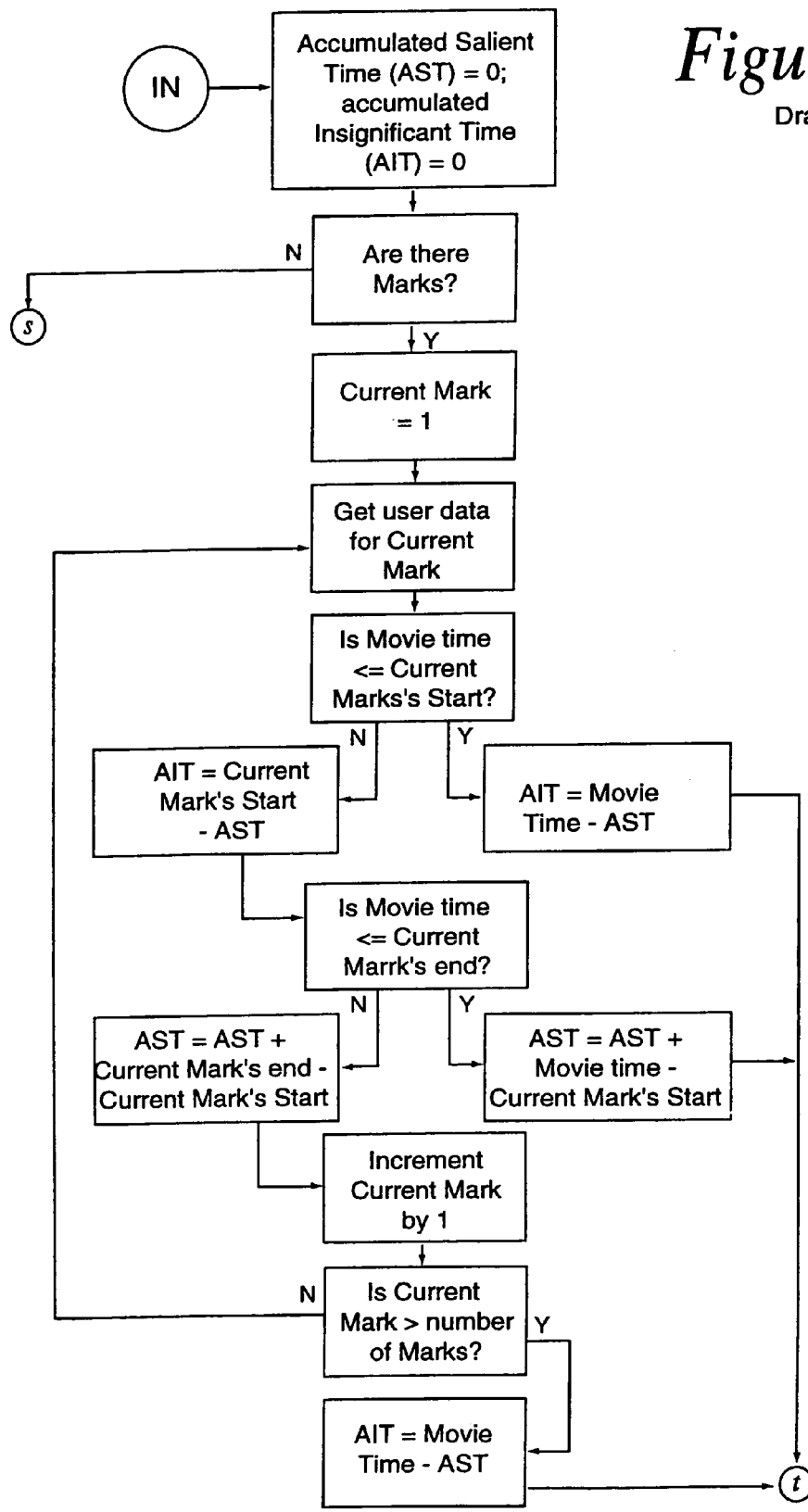
Figure 30B:
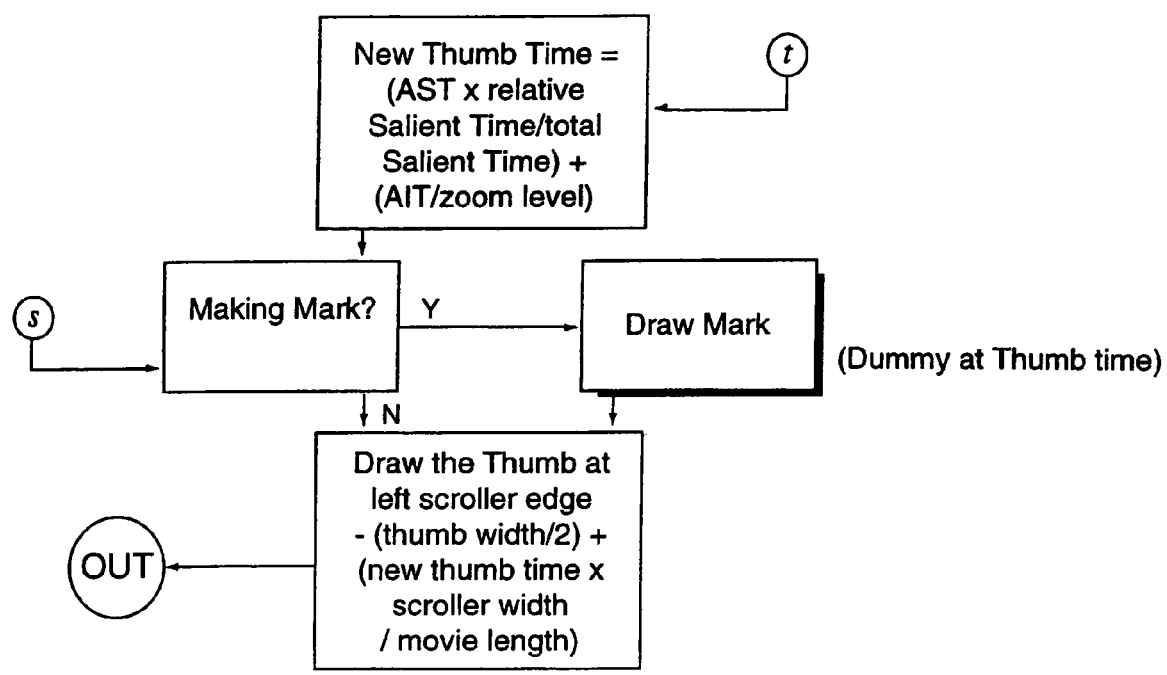
Figure 31A:
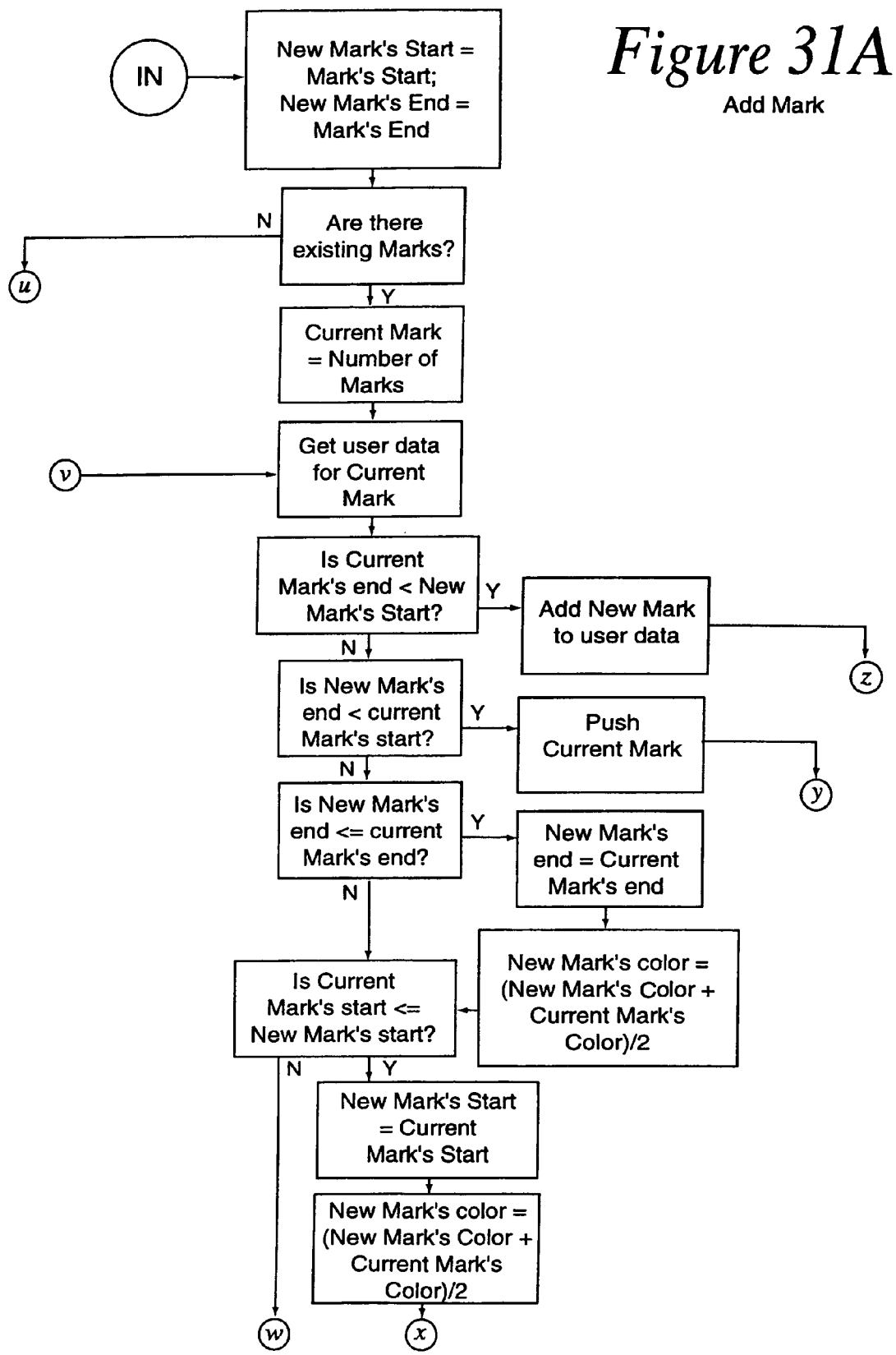
Figure 31B:
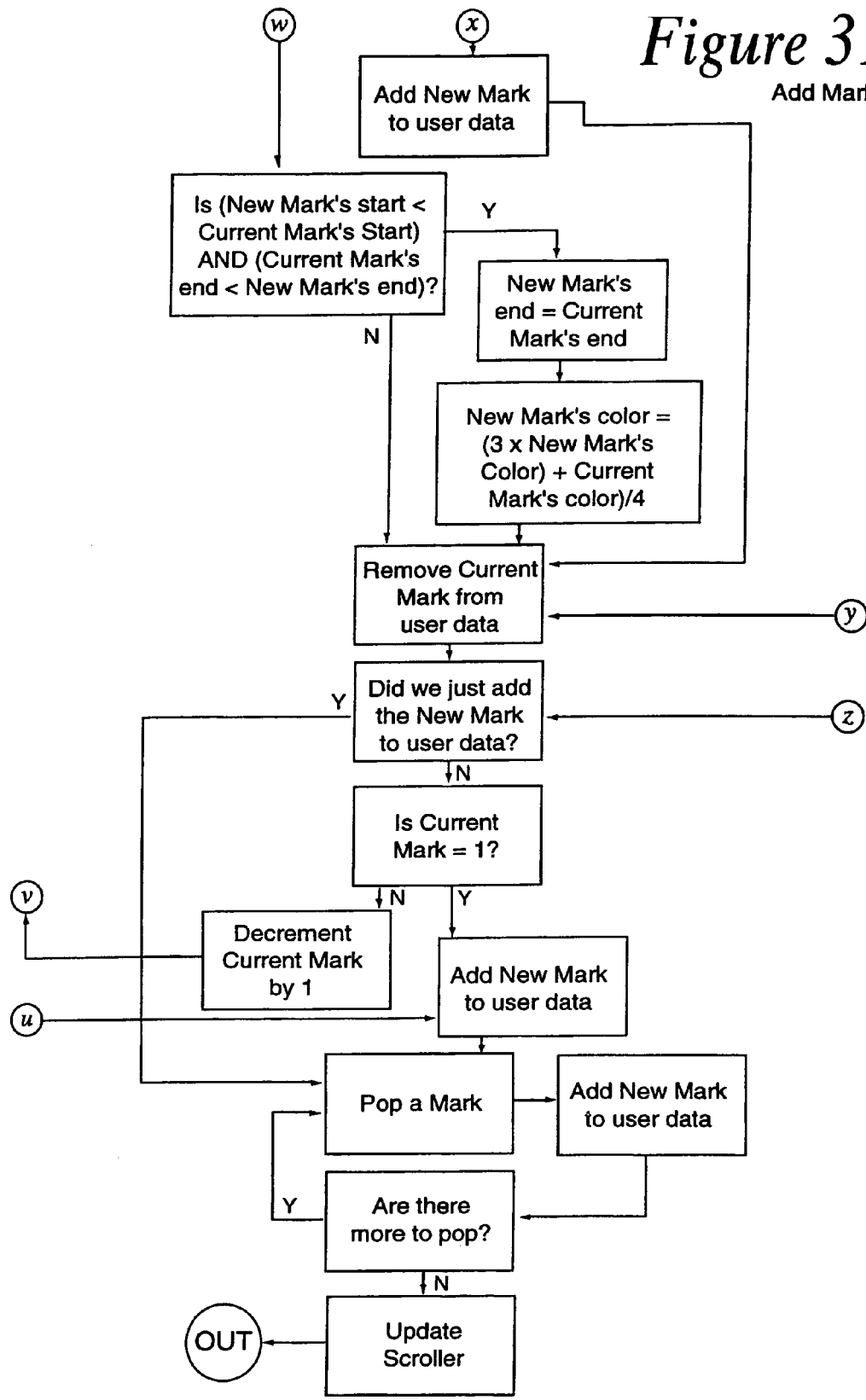
Figure 32A:
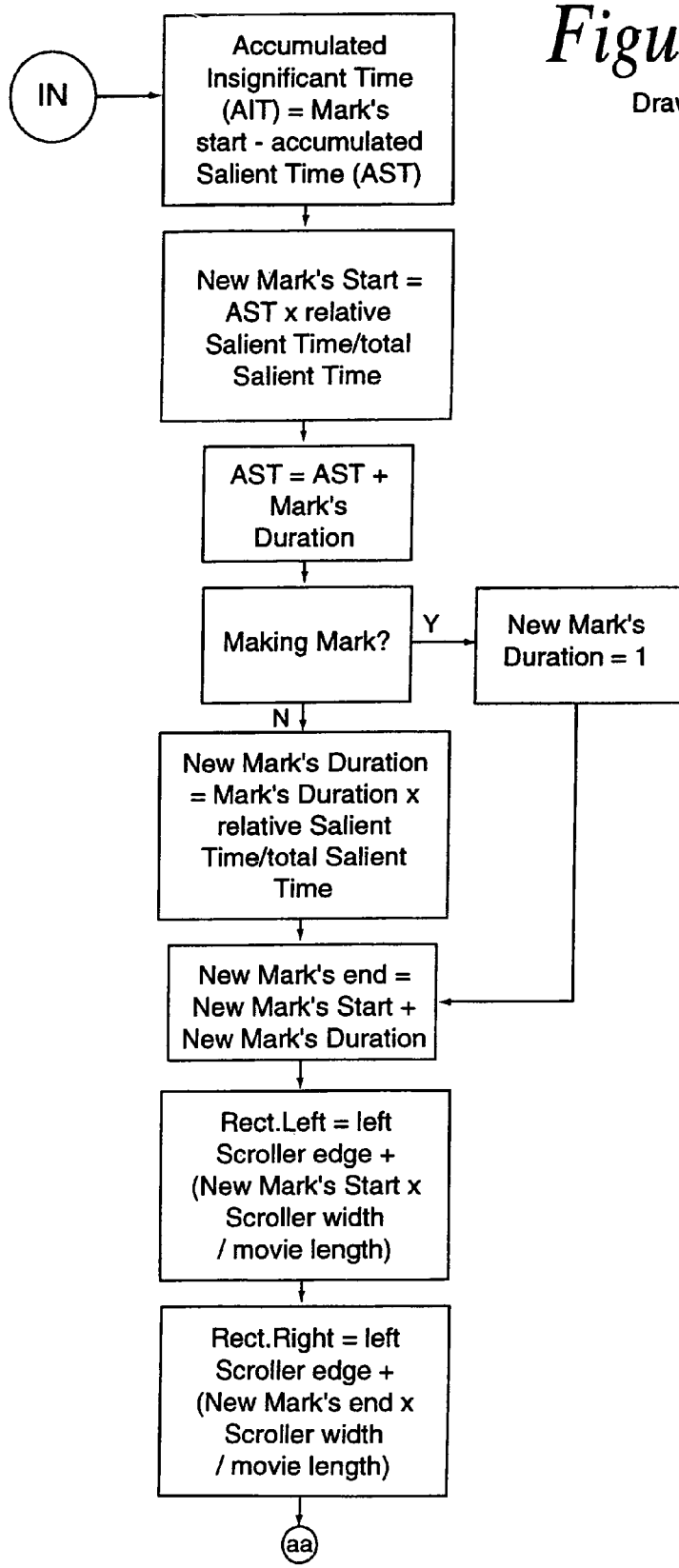
Figure 32B:
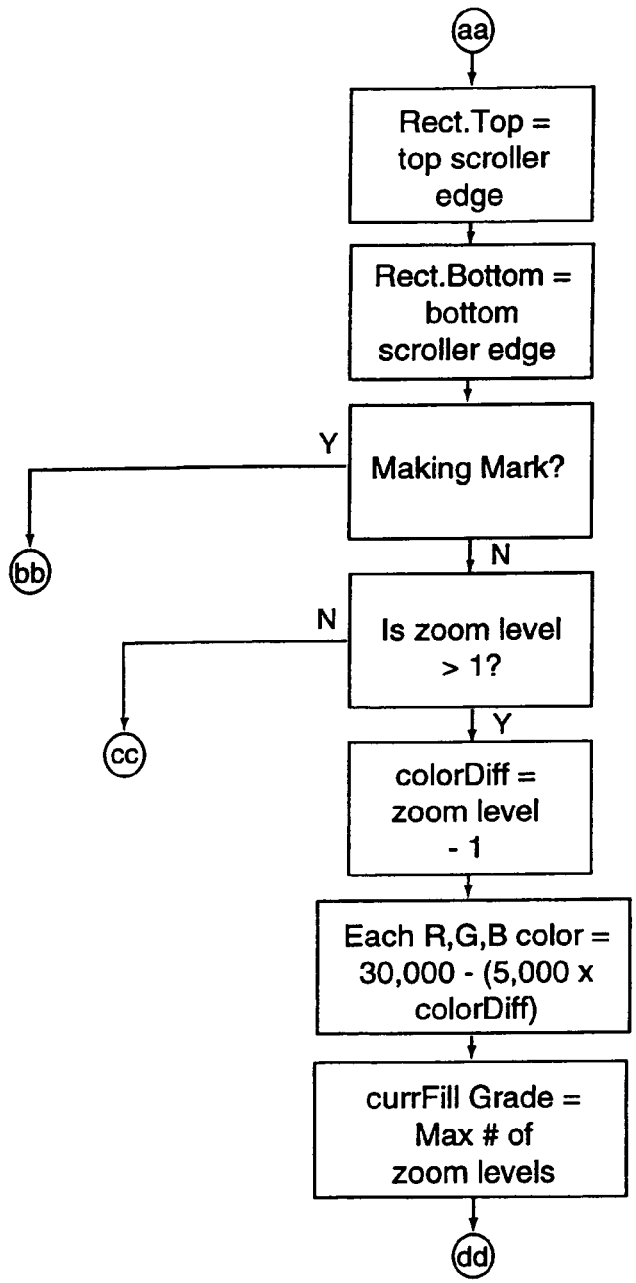
Figure 32C:
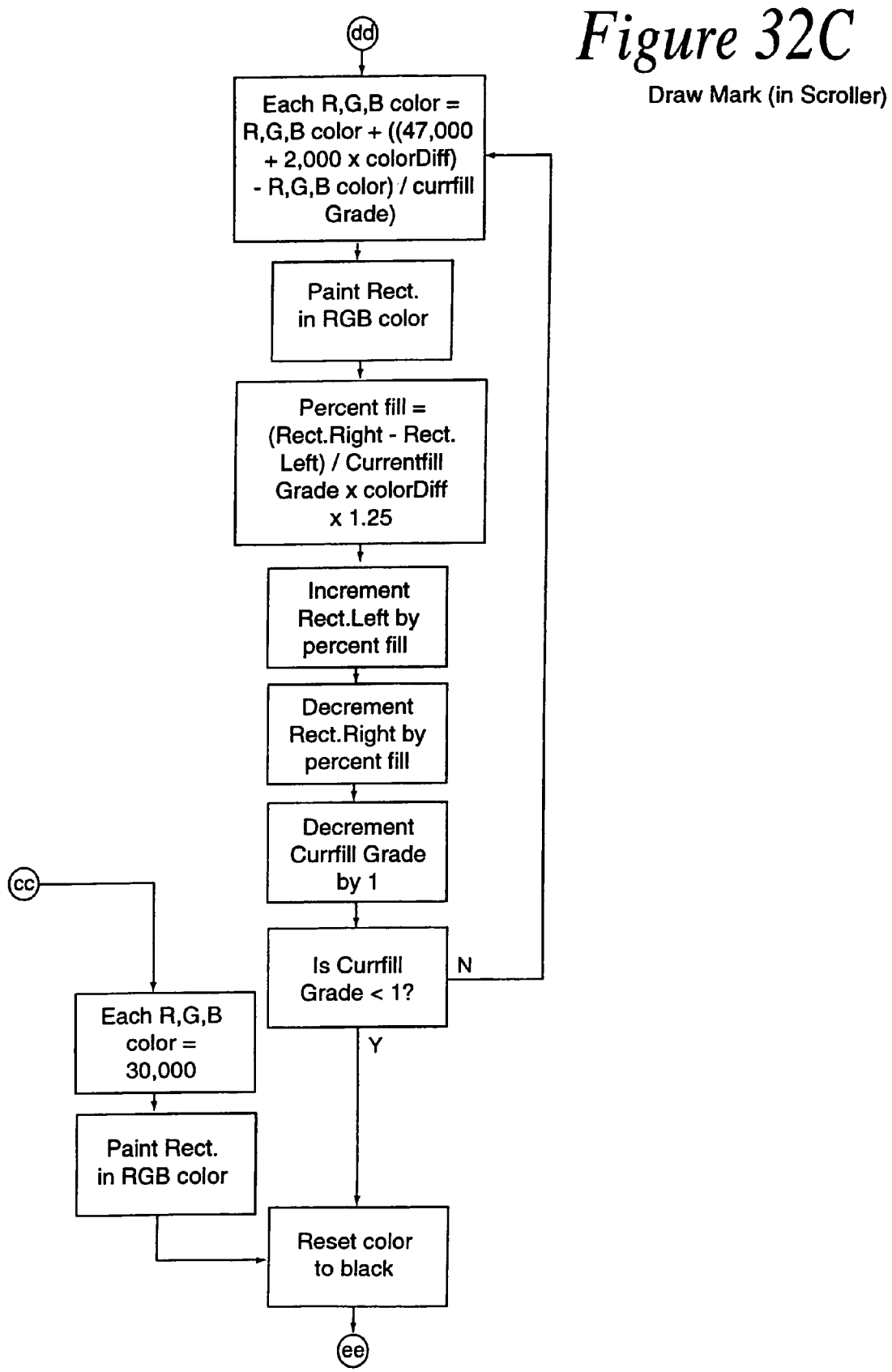
Figure 32D:
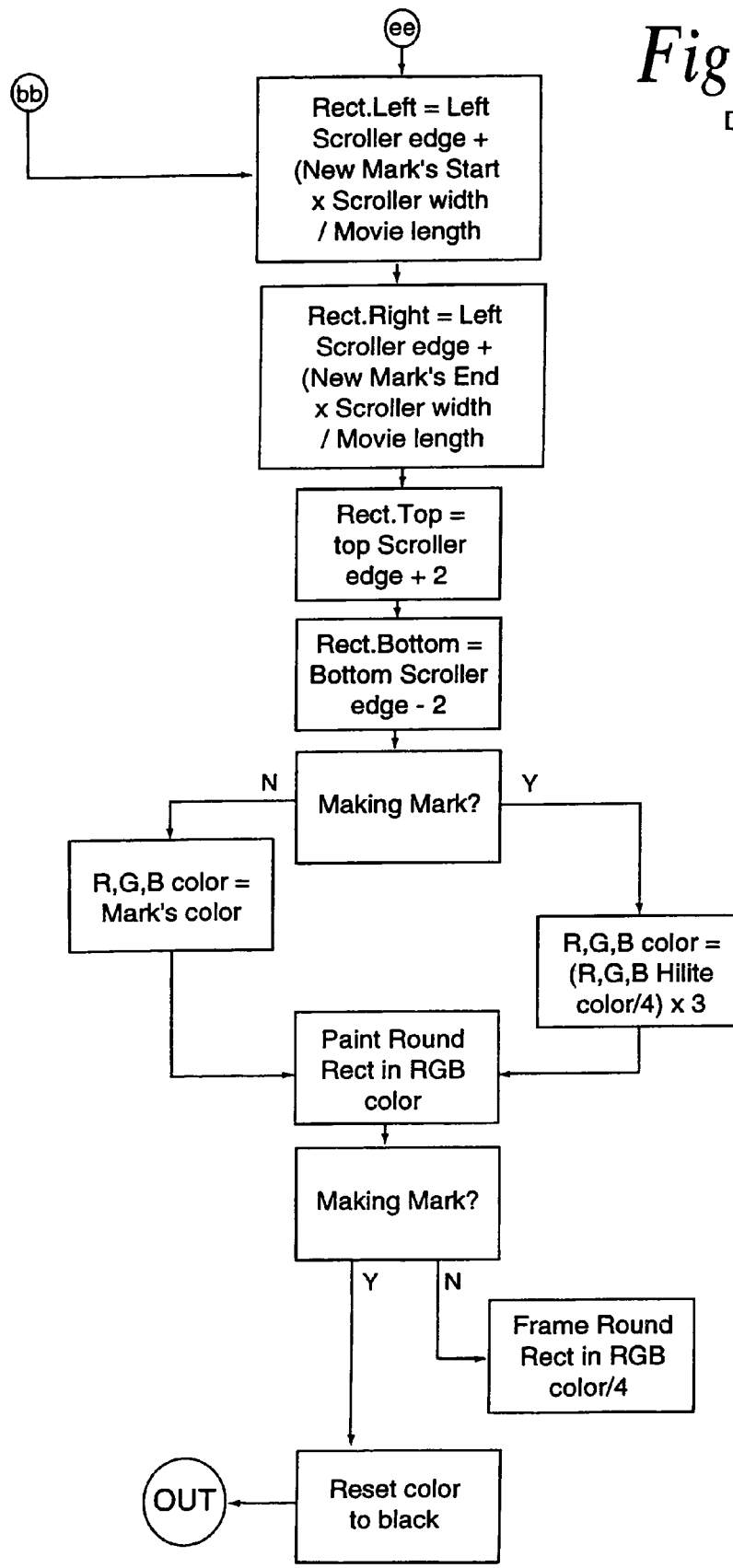

The person skilled in the art will have no trouble in understanding and implementing the flow charts illustrated. Virtually all of the statements printed in the flow chart boxes are understandable, and no need exists to repeat the text herein. However, certain statements require some explanation. The statements in the blocks indicated by double lines, such as block 85 in FIG. 17, represent calls to subroutines as labeled that are detailed in another of the figures. Thus, the Track Thumb routine 85 flow chart is shown in FIG. 29. In the labels, "button" refers to the mouse button, a "pressed" button, as in the Macintosh, changes its 3-d appearance to appear pressed; an "unpressed" button is the reverse. "Play segment" refers to the right button 84 in FIG. 12. The examples given are with a colored scroll bar to represent the marked segments. "Zoom" designates magnification level. "Stamp cursor" means that when the screen cursor is moved within the movie displays, the cursor shape changes to resemble a rubber hand stamp, indicating to the user that by clicking, he or she can mark (stamp) the document to indicate a salient point. "Play speed" refers to play speed of the video. "Update scroller" means to redo the scroll bar to show user selections. Conducting tests are indicated in the boxes by question marks (?); Y or N indicates the test was or was not successful.

To summarize some important aspects of the invention:

Linear density of scroll bar (i.e. ruler) can be varied with document salience density;

Scrolling rate can be varied with document content density;

Amount of document in window can be varied with document salience density;

The zoom control function can be implemented by clicking the scale perspective button and dragging perpendicular to scroll bar to zoom between perspectives:

drag out from document→absolute scaling and drag towards document→relative scaling.

As a further alternative, the user can press an option key and click on the scroll bar, which will jump the thumb to the pointer position and simultaneously allow the user to scroll by moving the mouse horizontally and to change scale or magnification by moving the mouse perpendicularly (vertically) to the scroller. These changes will be visible on the screen display as well as on the scroll bar.

Since the program of the invention runs as an application, clicking on the document display can readily be used to add to the document data structure in memory the time or spatial position of the salient marked display portion when/where the pointer rested.

Marking data structures will be evident to those skilled in the art. For text documents, adding a mark is generally similar to adding a formatting or printing code to the stored text. Marking video is similar to text marking, except that remembering character position is replaced by remembering time position and storing it in the user data portion of the movie.

As further marking alternatives, for video, the mouse button for marking can be held depressed while the video plays and released to define a marking point or segment. For text, the salient text can be highlighted and a menu dropped to select a marking function.

Although there have been described what are at present considered to be the preferred embodiments of the invention, it will be understood that the invention may be embodied in other specific forms without departing from the essential characteristics thereof. The present embodiments are therefore to be considered in all respects as illustrative, and not restrictive. This scope of the invention is indicated by the appended claims rather than by the foregoing description.

APPENDIX A

1. Mackinlay, J., Robertson, G., and Card, S. The Perspective Wall: Detail and Context Smoothly Integrated. Proceedings ACMCHI '91 Human Factors in Computing Systems Conference (New Orleans, La., April 27-May 2, 1991). ACM, New York, pp. 173-179.
2. Furnas, G. Generalized Fisheye Views. Proceedings ACM CHI '86 Human Factors in Computing Systems Conference (Boston, Mass., Apr. 13-17, 1986). ACM, New York, pp. 16-23.
3. Mills, M., Cohen, J., & Wong Y. Y. A Magnifier Tool for Video Data. Proceedings ACM CHI '92 Human Factors in Computing Systems Conference (Monterey, CA, May 3-7, 1992). ACM, New York, pp. 93-98.
4. Degen, L., Mander, R., Salomon, G. Working with Audio: Integrating Personal Tape Recorders and Desktop Computers. Proceedings ACM CHI '92 Human Factors in Computing Systems Conference (Monterey, CA, May 3-7, 1992). ACM, New York, 1992, pp. 413-418.
5. Chimera, R. Value Bars: An Information Visualization and Navigation Tool for Multi-attribute Listings. Proceedings ACM CHI '92 Human Factors in Computings Systems Conference (Monterey, CA, May 3-7, 1992). ACM, New York, pp. 293-294.

What is claimed is:

1. One or more computer readable storage media, wherein said computer readable storage media is not a propagated signal(s), comprising instructions that when executed by a computer are capable of causing the computer to: generate a user interface; create a sequence comprising text segments; identify which of the text segments are salient based on at least one user-defined salience preference, wherein identification of text segment(s) as salient is independent from position(s) of segment(s) in the sequence and independent from structural hierarchy(s) in the sequence and independent from position(s) of segment(s) in the user interface; and vary display of the sequence so that only the salient segment(s) are displayed on the user interface without uniformly zooming all segments and without materially changing the allocation of space for display of each salient segment whereby each salient segment is made more prominent in comparison to non-salient segment(s).

2. The computer readable storage media of claim 1, wherein the instructions are further capable of causing the computer to provide a scroll bar on the user interface that includes a thumb having a size and a location on the scroll bar.

3. The computer readable storage media of claim 2, wherein the scroll bar is responsive to said varying display of the sequence.

4. The computer readable storage media of claim 2, wherein the instructions are further capable of causing the computer to adjust the size of the thumb in response to said varying display of the sequence.

5. The computer readable storage media of claim 1, wherein the instructions are further capable of causing the computer to annotate at least one of the salient segment(s).

6. The computer readable storage media of claim 1, wherein the instructions are further capable of causing the computer to display a graphical user interface element on the user interface that allows a user to control which text segment(s) of the sequence are displayed.

7. The computer readable storage media of claim 6, wherein the graphical user interface element includes a slide control.

8. The computer readable storage media of claim 7, wherein the slide control allows a user to vary which text segment(s) of the sequence are displayed.

9. The computer readable storage media of claim 1, wherein the instructions are further capable of causing the computer to modify a linear representation of the sequence into a non-linear representation without uniformly zooming all segments and without materially changing the allocation of space for display of each salient segment whereby each salient segment is made more prominent in comparison to non-salient segment(s).

10. One or more computer readable storage media, wherein said computer readable storage media is not a propagated signal(s), comprising instructions that when executed by a computer are capable of causing the computer to: generate a user interface; process a sequence comprising text segments that can be displayed on the user interface; automatically identify and mark which of the text segments are salient based on at least one user-defined salience preference, wherein identification of text segment(s) as salient is independent from position(s) of segment(s) in the sequence and independent from structural hierarchy(s) in the sequence and independent from position(s) of segment(s) in the user interface; and vary display of the sequence so that only the salient segment(s) are displayed on the user interface without uniformly zooming all segments and without materially changing the allocation of space for display of each salient segment whereby each salient segment is made more prominent in comparison to non-salient segment(s).

11. The computer readable storage media of claim 10, wherein the instructions are further capable of causing the computer to provide a scroll bar on the user interface that includes a thumb having a size and a location on the scroll bar.

12. The computer readable storage media of claim 11, wherein the size of the thumb is responsive to said varying display of the sequence.

13. The computer readable storage media of claim 10, wherein the instructions are further capable of causing the computer to annotate at least one of the salient segment(s).

14. The computer readable storage media claim 10, wherein the instructions are further capable of causing the computer to display a graphical user interface element that allows a user to control which text segment(s) of the sequence are displayed.

15. The computer readable storage media of claim 14, wherein the graphical user interface element includes a slide control.

16. The computer readable storage media of claim 15, wherein the slide control allows a user to vary which text segment(s) of the sequence are displayed.

17. The computer readable storage media of claim 10, wherein the instructions are further capable of causing the computer to modify a linear representation of the sequence into a non-linear representation without uniformly zooming all segments and without materially changing the allocation of space for display of each salient segment, whereby each salient segment is made more prominent in comparison to non-salient segment(s).

18. The computer readable storage media of claim 10, wherein the instructions are further capable of causing the computer to add data to mark the salient segment(s).

19. The computer readable storage media of claim 18, wherein the data is a tag bit.

20. One or more computer readable storage media, wherein said computer readable storage media is not a propagated signal(s), comprising instructions that when executed by a computer are capable of causing the computer to: generate a user interface; process a sequence comprising text segments that can be displayed on the user interface; identify which of the text segments are salient based on at least one user-defined salience preference, wherein identification of text segment(s) as salient is independent from position(s) of segment(s) in the sequence and independent from structural hierarchy(s) in the sequence and independent from position(s) of segment(s) in the user interface; vary display of the sequence so that only the salient segment(s) are displayed on the user interface without uniformly zooming all segments and without materially changing the allocation of space for display of each salient segment whereby each salient segment is made more prominent in comparison to non-salient segment(s); and provide a scroll bar on the user interface that includes a thumb having a size, wherein the size of the thumb is responsive to said varying display of the sequence.

21. The computer readable storage media of claim 20, wherein the instructions are further capable of causing the computer to display a graphical user interface element that allows a user to control which text segment(s) of the sequence are displayed.

22. The computer readable storage media of claim 21, wherein the graphical user interface element includes a slide control that allows a user to vary which text segment(s) of the sequence are displayed.

23. The computer readable storage media of claim 22, wherein the instructions are further capable of causing the computer to add data to mark the salient segment(s).

24. One or more computer readable storage media, wherein said computer readable storage media is not a propagated signal(s), comprising instructions that when executed by a computer are capable of causing the computer to: generate a user interface; create a sequence comprising text segments; identify which of the text segments are salient based on at least one user-defined salience preference, wherein identification of text segment(s) as salient is independent from position(s) of segment(s) in the sequence and independent from structural hierarchy(s) in the sequence and independent from position(s) of segment(s) in the user interface, wherein the user interface includes a graphical user interface element with a slide control that is displayed on the user interface; display the sequence on the user interface; vary display of the sequence in response to the slide control by reducing the allocation of space for display of non-salient segment(s) without uniformly zooming all segments and without materially changing the allocation of space for display of each salient segment whereby each salient segment is made more prominent in comparison to non-salient segment(s); and highlight the display of each salient segment on the user interface.

25. The computer readable storage media of claim 24, wherein the instructions are further capable of causing the computer to provide a scroll bar on the user interface that includes a thumb having a size and a location on the scroll bar.

26. The computer readable storage media of claim 25, wherein the scroll bar is responsive to said varying display of the sequence.

27. The computer readable storage media of claim 25, wherein the location of the thumb on the scroll bar is affected by said varying display of the sequence.

28. The computer readable storage media of claim 25, wherein the location of the thumb on the scroll bar corresponds to a spatial position of at least one of the salient segment(s) in the sequence.

29. The computer readable storage media of claim 24, wherein the instructions are further capable of causing the computer to annotate each salient segment.

30. One or more computer readable storage media, wherein said computer readable storage media is not a propagated signal(s), comprising instructions that when executed by a computer are capable of causing the computer to: generate a user interface; process a sequence comprising text segments; display the sequence on the user interface; automatically identify which of the text segments are salient based on at least one user-defined salience preference, wherein identification of text segment(s) as salient is independent from position(s) of segment(s) in the sequence and independent from structural hierarchy(s) in the sequence and independent from position(s) of segment(s) in the user interface; and modify the display of the sequence by utilizing a graphical user interface element displayed on the user interface, wherein the graphical user interface element includes a slide control that reduces the allocation of space for the display of non-salient segment(s) without uniformly zooming all segments and without materially changing the allocation of space for the display of each salient segment whereby each salient segment is made more prominent in comparison to non-salient segment(s).

31. The computer readable storage media of claim 30, wherein the instructions are further capable of causing the computer to provide a scroll bar on the user interface that includes a thumb having a size and a location on the scroll bar.

32. The computer readable storage media of claim 31, wherein the scroll bar is responsive to said graphical user interface element.

33. The computer readable storage media of claim 31, wherein the location of the thumb on the scroll bar is affected by said modifying the display of the sequence.

34. The computer readable storage media of claim 31, wherein the location of the thumb on the scroll bar corresponds to a spatial position of at least one of the salient segment(s) in the sequence.

35. The computer readable storage media of claim 30, wherein the display of each salient segment is highlighted.

36. The computer readable storage media of claim 30, wherein the instructions are further capable of causing the computer to annotate each salient segment.

37. The computer readable storage media of claim 30, wherein the instructions are further capable of causing the computer to add data to mark the salient segment(s).

38. The computer readable storage media of claim 37, wherein the data is a tag bit.

39. One or more computer readable storage media, wherein said computer readable storage media is not a propagated signal(s), comprising instructions that when executed by a computer are capable of causing the computer to: generate a user interface; process a sequence comprising text segments; display the sequence on the user interface; identify which of the text segments are salient based on at least one user-defined salience preference, wherein identification of text segment(s) as salient is independent from position(s) of segment(s) in the sequence and independent from structural hierarchy(s) in the sequence and independent from position(s) of segment(s) in the user interface; modify the display of the sequence by utilizing a graphical user interface element displayed on the user interface, wherein the graphical user interface element includes a slide control that reduces the allocation of space for the display of non-salient segment(s) without uniformly zooming all segments and without materially changing the allocation of space for the display of each salient segment whereby each salient segment is made more prominent in comparison to non-salient segment(s); provide a scroll bar on the user interface that includes a thumb having a location on the scroll bar, wherein the location of the thumb on the scroll bar is affected by said modifying the display of the sequence; and highlight the display of each salient segment.

40. The computer readable storage media of claim 39, wherein the instructions are further capable of causing the computer to add data to mark the salient segment(s).

41. One or more computer readable storage media, wherein said computer readable storage media is not a propagated signal(s), comprising instructions that when executed by a computer are capable of causing the computer to: generate a user interface; create a sequence comprising text identify which of the text segments are salient based on at least one user-defined salience preference, wherein identification of text segment(s) as salient is independent from position(s) of segment(s) in the sequence and independent from structural hierarchy(s) in the sequence and independent from position(s) of segment(s) in the user interface; modify a linear representation of the sequence into a non-linear representation without uniformly zooming all segments and without materially changing the allocation of space for display of each salient segment, whereby each salient segment is made more prominent in comparison to non-salient segment(s); and display the non-linear representation of the sequence on the user interface.

42. The computer readable storage media of claim 41, wherein the instructions are further capable of causing the computer to provide a scroll bar on the user interface that includes a thumb having a size and a location on the scroll bar.

43. The computer readable storage media of claim 42, wherein the scroll bar is responsive to said modifying the representation of the sequence.

44. The computer readable storage media of claim 42, wherein the instructions are further capable of causing the computer to adjust the size of the thumb in response to said modifying the representation of the sequence.

45. The computer readable storage media of claim 41, wherein the instructions are further capable of causing the computer to annotate at least one of the salient segment(s).

46. One or more computer readable storage media, wherein said computer readable storage media is not a propagated signal(s), comprising instructions that when executed by a computer are capable of causing the computer to: generate a user interface; process a sequence comprising text segments; automatically identify which of the text segments are salient based on at least one user-defined salience preference, wherein identification of text segment(s) as salient is independent from position(s) of segment(s) in the sequence and independent from structural hierarchy(s) in the sequence and independent from position(s) of segment(s) in the user interface; modify a linear representation of the sequence into a non-linear representation without uniformly zooming all segments and without materially changing the allocation of space for display of each salient segment, whereby each salient segment is made more prominent in comparison to non-salient segment(s); and display the non-linear representation of the sequence on the user interface.

47. The computer readable storage media of claim 46, wherein the instructions are further capable of causing the computer to provide a scroll bar on the user interface that includes a thumb having a size and a location on the scroll bar.

48. The computer readable storage media of claim 47, wherein the size of the thumb is responsive to said modifying the representation of the sequence.

49. The computer readable storage media of claim 46, wherein the instructions are further capable of causing the computer to annotate at least one of the salient segment(s).

50. The computer readable storage media of claim 46, wherein the instructions are further capable of causing the computer to add data to mark the salient segment(s).

51. The computer readable storage media of claim 50, wherein the data is a tag bit.

52. One or more computer readable storage media, wherein said computer readable storage media is not a propagated signal(s), comprising instructions that when executed by a computer are capable of causing the computer to: generate a user interface; process a sequence comprising text segments; identify which of the text segments are salient based on at least one user-defined salience preference, wherein identification of text segment(s) as salient is independent from position(s) of segment(s) in the sequence and independent from structural hierarchy(s) in the sequence and independent from position(s) of segment(s) in the user interface; modify a linear representation of the sequence into a non-linear representation without uniformly zooming all segments and without materially changing the allocation of space for display of each salient segment, whereby each salient segment is made more prominent in comparison to non-salient segment(s); provide a scroll bar on the user interface that includes a thumb having a size, wherein the size of the thumb is responsive to said modifying the representation of the sequence; and display the non-linear representation of the sequence on the user interface.

53. The computer readable storage media of claim 52, wherein the instructions are further capable of causing the computer to add data to mark the salient segment(s).

54. One or more computer readable storage media, wherein said computer readable storage media is not a propagated signal(s), comprising instructions that when executed by a computer are capable of causing the computer to: generate a user interface; display a sequence comprising text segments that can be displayed on the user interface; identify which of the text segments are salient based on at least one user-defined salience preference, wherein identification of text segment(s) as salient is independent from position(s) of segment(s) in the sequence and independent from structural hierarchy(s) in the sequence and independent from position(s) of segment(s) in the user interface; and vary the display of the sequence by reducing the allocation of space for the display of non-salient segment(s) without uniformly zooming all segments and without materially changing the allocation of space for the display of each salient segment whereby each salient segment is made more prominent in comparison to non-salient segment(s).

55. The computer readable storage media of claim 54, wherein the instructions are further capable of causing the computer to highlight the display of each salient segment.

56. The computer readable storage media of claim 54, wherein the instructions are further capable of causing the computer to provide a scroll bar on the user interface that includes a thumb having a size and a location on the scroll bar.

57. The computer readable storage media of claim 56, wherein the scroll bar is responsive to said varying the display of the sequence.

58. The computer readable storage media of claim 56, wherein the instructions are further capable of causing the computer to adjust the size of the thumb in response to said varying the display of the sequence.

59. The computer readable storage media of claim 54, wherein the instructions are further capable of causing the computer to modify a linear representation of the sequence into a non-linear representation without uniformly zooming all segments and without materially changing the allocation of space for the display of each salient segment, whereby each salient segment is made more prominent in comparison to non-salient segment(s).

60. The computer readable storage media of claim 54, wherein the instructions are further capable of causing the computer to annotate each salient segment.

61. The computer readable storage media of claim 54, wherein the instructions are further capable of causing the computer to add data to mark each salient segment.

62. The computer readable storage media of claim 61, wherein the data is a tag bit.

63. One or more computer readable storage media, wherein said computer readable storage media is not a propagated signal(s), comprising instructions, that when executed by a computer are capable of causing the computer to: generate a user interface; display a sequence comprising text segments that can be displayed on the user interface; automatically identify which of the text segments are salient based on at least one user-defined salience preference, wherein identification of text segment(s) as salient is independent from position(s) of segment(s) in the sequence and independent from structural hierarchy(s) in the sequence and independent from position(s) of segment(s) in the user interface; modify the display of the sequence by reducing the allocation of space for the display of non-salient segment(s) without uniformly zooming all segments and without materially changing the allocation of space for the display of each salient segment whereby each salient segment is made more prominent in comparison to non-salient segment(s).

64. The computer readable storage media of claim 63, wherein the instructions are further capable of causing the computer to provide a scroll bar on the user interface that includes a thumb having a size and a location on the scroll bar.

65. The computer readable storage media of claim 64, wherein the size of the thumb is responsive to said modifying the display of the sequence.

66. The computer readable storage media of claim 63, wherein the instructions are further capable of causing the computer to annotate each salient segment.

67. The computer readable storage media of claim 63, wherein the instructions are further capable of causing the computer to add data to mark each salient segment.

68. The computer readable storage media of claim 67, wherein the data is a tag bit.

69. One or more computer readable storage media, wherein said computer readable storage media is not a propagated signal(s), comprising instructions that when executed by a computer are capable of causing the computer to: generate a user interface; display a sequence comprising text segments that can be displayed on the user interface; identify which of the text segments are salient based on at least one user-defined salience preference, wherein identification of text segment(s) as salient is independent from position(s) of segment(s) in the sequence and independent from structural hierarchy(s) in the sequence and independent from position(s) of segment(s) in the user interface; modify the display of the sequence by reducing the allocation of space for the display of non-salient(s) segment without uniformly zooming all segments and without materially changing the allocation of space for the display of each salient segment whereby each salient segment is made more prominent in comparison to non-salient segment(s); provide at least one graphical user interface element on the user interface that allows a user to control said modifying the display of the sequence; provide a scroll bar on the user interface that includes a thumb having a size, wherein the size of the thumb is responsive to said modifying the display of the sequence; and highlight the display of each salient segment.

70. The computer readable storage media of claim 69, wherein the instructions are further capable of causing the computer to add data to mark the salient segment(s).

71. A computer-implemented method of presenting text for display comprising:
 a. generating a user interface;
 b. processing a sequence comprising text segments;
 c. identifying which of the text segments are salient based on at least one user-defined salience preference, wherein identification of text segment(s) as salient is independent from position(s) of segment(s) in the sequence and independent from structural hierarchy(s) in the sequence and independent from position(s) of segment(s) in the user interface;
 d. modifying a linear representation of the sequence into a non-linear representation without uniformly zooming all segments and without materially changing the allocation of space for display of each salient segment on the user interface, whereby each salient segment is made more prominent in comparison to non-salient segment(s);
 e. providing a scroll bar on the user interface that includes a thumb having a size, wherein the size of the thumb is responsive to said modifying the representation of the sequence; and
 f. presenting the non-linear representation of the sequence for display on the user interface.

72. The computer-implemented method of claim 71, further comprising: adding data to mark the salient segment(s).

73. A computer-implemented method of presenting text for display comprising:
 a. generating a user interface;
 b. presenting a sequence comprising text segments for display on the user interface;
 c. automatically identifying which of the text segments are salient based on at least one user-defined salience preference, wherein identification of text segment(s) as salient is independent from position(s) of segment(s) in the sequence and independent from structural hierarchy(s) in the sequence and independent from position(s) of segment(s) in the user interface; and
 d. modifying the presentation of the sequence by reducing the allocation of space for display of non-salient segment(s) without uniformly zooming all segments and without materially changing the allocation of space for display of each salient segment whereby each salient segment is made more prominent in comparison to non-salient segment(s).

74. The computer-implemented method of claim 73, further comprising: providing a scroll bar on the user interface that includes a thumb having a size and a location on the scroll bar.

75. The computer-implemented method of claim 74, wherein the size of the thumb is responsive to said modifying the presentation of the sequence.

76. The computer-implemented method of claim 73, further comprising: annotating each salient segment.

77. The computer-implemented method of claim 73, further comprising: adding data to mark each salient segment.

78. A computer-implemented method of presenting text for display comprising:
 a. generating a user interface;
 b. presenting a sequence comprising text segments for display on the user interface;
 c. identifying which of the text segments are salient based on at least one user-defined salience preference, wherein identification of text segment(s) as salient is independent from position(s) of segment(s) in the sequence and independent from structural hierarchy(s) in the sequence and independent from position(s) of segment(s) in the user interface;
 d. modifying the presentation of the sequence by reducing the allocation of space for display of non-salient segment(s) without uniformly zooming all segments and without materially changing the allocation of space for display of each salient segment(s) whereby each salient segment is made more prominent in comparison to non-salient segment(s);
 e. providing at least one graphical user interface element on the user interface that allows a user to control said modifying the presentation of the sequence;
 f. providing a scroll bar on the user interface that includes a thumb having a size, wherein the size of the thumb is responsive to said modifying the presentation of the sequence for display on the user interface; and
 g. highlighting the presentation of each salient segment for display on the user interface.

79. The computer-implemented method of claim 78, further comprising: adding data to mark the salient segment(s).

* * * * *

UNITED STATES PATENT AND TRADEMARK OFFICE
CERTIFICATE OF CORRECTION

PATENT NO.         : 8,381,126 B2
APPLICATION NO.    : 09/947196
DATED              : February 19, 2013
INVENTOR(S)        : Gould Page 1 of 3

It is certified that error appears in the above-identified patent and that said Letters Patent is hereby corrected as shown below:

On the Title page Related U.S. Application Data should read:
Item (63) "Continuation of prior application No. 09/451,594, filed Nov. 30, 1999, now Pat. No. 6,335,730, which is a continuation of application No. 08/844,466 filed Apr. 18, 1997, now Pat. No. 6,177,938, which is a continuation of application No. 07/990,339, filed Dec. 14, 1992, now Pat. No. 5,623,588."

Item 56 References Cited (and considered) should include:
Application File for U.S. Appl. No. 07/990,339, filed Dec. 14, 1992, US Pat. 5,623,588 now abandoned. cited by applicant.
Application File for U.S. Appl. No. 08/844,466, filed Apr. 16, 1997, US Pat. 6,177,938. cited by applicant.
Application File for U.S. Appl. No. 09/451,595, filed Nov. 30, 1999, US Pat. 6,219,052. cited by applicant.
Application File for U.S. Appl. No. 09/452,275, filed Nov. 30, 1999, US Pat. 6,215,491. cited by applicant.
Application File for U.S. Appl. No. 09/451,594, filed Nov. 30, 1999, US Pat. 6,335,730. cited by applicant.
Application File for U.S. Appl. No. 09/947,196, filed Sep. 4, 2001. cited by applicant.
Application File for U.S. Appl. No. 11/978,965, filed Oct. 30, 2007. cited by applicant.
Application File for U.S. Appl. No. 11/978,964, filed Oct. 30, 2007. cited by applicant.
Application File for U.S. Appl. No. 11/978,945, filed Oct. 30, 2007. cited by applicant.
Application File for U.S. Appl. No. 12/248,931, filed Oct. 10, 2008. cited by applicant.
Application File for U.S. Appl. No. 09/298,336, filed Apr. 23, 1999, US Pat. 6,393,158. cited by applicant.
Application File for U.S. Appl. No. 10/107,945, filed Mar. 26, 2002, US Pat. 6,615,270. cited by applicant.
Application File for U.S. Appl. No. 10/603,581, filed Jun. 24, 2003, US Pat. 7,467,218. cited by applicant.
(continued on page 2 of 3)

Signed and Sealed this
Twenty-sixth Day of March, 2013

Teresa Stanek Rea
*Acting Director of the United States Patent and Trademark Office*

CERTIFICATE OF CORRECTION (continued)
U.S. Pat. No. 8,381,126 B2

On the Title page, Item 56 (continued from page 1 of 3)

Application File for U.S. Appl. No. 11/978,966, filed Oct. 30, 2007, US Pat. 7,890,648. cited by applicant.
Application File for U.S. Appl. No. 11/978,967, filed Oct. 30, 2007, abandoned. cited by applicant.
Application File for U.S. Appl. No. 11/978,954, filed Oct. 30, 2007, abandoned. cited by applicant.
Application File for U.S. Appl. No. 12/941,830, filed Nov. 8, 2010. cited by applicant.
Application File for U.S. Appl. No. 09/298,681, filed Apr. 23, 1999, US Pat. 6,621,980. cited by applicant.
Application File for U.S. Appl. No. 09/298,586, filed Apr. 23, 1999, abandoned. cited by applicant.
Application File for U.S. Appl. No. 10/360,271, filed Feb. 7, 2003, abandoned. cited by applicant.
Lavallee Application File for U.S. Appl. No. 08/508,971, filed Jul. 28, 1995, US Pat. 5,737,552. cited by applicant.
Daniels Application File for U.S. Appl. No. 08/038,240, filed Mar. 29, 1993, Daniels. cited by applicant.
Daniels Application File for U.S. Appl. No. 08/306,642, filed Sep. 15, 1994, Daniels. cited by applicant.
Daniels Provisional Application File for U.S. Appl. No. 60/014,959, filed Apr. 8, 1996, Daniels. cited by applicant.
Daniels Application File for U.S. Appl. No. 08/641,517, filed May 1, 1996, Daniels. cited by applicant.
Daniels Application File for U.S. Appl. No. 08/900,417, filed Jul. 25, 1997, Daniels. cited by applicant.
Daniels Application File for U.S. Appl. No. 09/992,190, filed Nov. 16, 2001, US Pat. 6,973,669. cited by applicant.
Daniels Application File for U.S. Appl. No. 11/250,807, filed Oct. 14, 2005, US Pat. 7,437,751. cited by applicant.
Daniels Application File for U.S. Appl. No. 12/246,161, filed Oct. 6, 2008, Daniels. cited by applicant.
P2 left column L35 "Dagen" should be "Degen"
P2 left column L42 "Plech Piech" should be "Piech"
P2 right column L20 "Dagen" should be "Degen"
P2 right column L24 "5828995 A 10/1998 Chiang Satyamurti" should be "5828995 A   10/1998 Chiang S In the Written Specification:
C1L6-15 should read:
"The present continuation application claims the benefit of U.S. application Ser. No. 09/451,594, filed Nov. 30, 1999, now U.S. Pat. No. 6,335,730 and entitled Computer User Interface with Non-Salience De-Emphasis which in turn claims benefit of prior application Ser. No. 08/844,466 filed Apr. 18, 1997, now U.S. Pat. No. 6,177,938 and entitled Computer User Interface with Non-Salience De-Emphasis, and which is a continuation of prior application Ser. No. 07/990,339 filed Dec. 14, 1992, now U.S. Pat. No. 5,623,588 and entitled Computer User Interface with Non-Salience De-Emphasis, incorporated herein by reference."
C3L31 "title bar in the window" should be "title bar 22 in the window"

CERTIFICATE OF CORRECTION (continued)
U.S. Pat. No. 8,381,126 B2

C4L5 "FIG. 2-14" should be "FIGS. 2-14"
C4L32 "side. clicking" should be "side. Clicking"
C6L55 "macintosh" should be "Macintosh"
C7L22 "what appears" should be "What appears"
C8L35 "starttime" should be "startTime"
C8L60 "Addsion-Wesley" should be "Addison-Wesley"